(12) United States Patent
Katsuta et al.

(10) Patent No.: US 10,684,712 B2
(45) Date of Patent: Jun. 16, 2020

(54) DISPLAY APPARATUS

(71) Applicant: Japan Display Inc., Tokyo (JP)

(72) Inventors: Tadayoshi Katsuta, Tokyo (JP);
Toshiaki Fukushima, Tokyo (JP);
Naoyuki Obinata, Tokyo (JP); Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 143 days.

(21) Appl. No.: 15/407,511

(22) Filed: Jan. 17, 2017

(65) Prior Publication Data

US 2017/0212624 A1 Jul. 27, 2017

(30) Foreign Application Priority Data

Jan. 27, 2016 (JP) ................. 2016-013572

(51) Int. Cl.
*G06F 3/041* (2006.01)
*G06F 3/044* (2006.01)
*G02F 1/1333* (2006.01)
*G02F 1/1362* (2006.01)

(52) U.S. Cl.
CPC ........ *G06F 3/0412* (2013.01); *G02F 1/13338* (2013.01); *G06F 3/044* (2013.01); *G06F 3/0416* (2013.01); *G02F 1/136286* (2013.01); *G06F 2203/04108* (2013.01)

(58) Field of Classification Search
CPC ...... G06F 3/0412; G06F 3/0416; G06F 3/044; G06F 2203/04108; G02F 1/13338; G02F 1/134309; G02F 1/1368; G02F 1/136286; G02F 1/13306; G02F 1/13452
See application file for complete search history.

(56) References Cited

U.S. PATENT DOCUMENTS

| | | | |
|---|---|---|---|
| 9,367,165 B2 | 6/2016 | Araki et al. | |
| 2012/0262387 A1* | 10/2012 | Mizuhashi | G06F 3/0412 345/173 |
| 2015/0145822 A1* | 5/2015 | Katsuta | G06F 3/044 345/174 |

FOREIGN PATENT DOCUMENTS

JP 2015-075605 A 4/2015

* cited by examiner

*Primary Examiner* — Jimmy H Nguyen
(74) *Attorney, Agent, or Firm* — Michael Best & Friedrich LLP

(57) ABSTRACT

A display apparatus includes a first pad electrically connected to the drive circuit, a voltage supply line having one end electrically connected to the first pad, a common wire electrically connected to the voltage supply line and the second electrode, a transistor formed between the voltage supply line and the common wire, and a branch wire being a part of the voltage supply line, extending from a branch section, and electrically connected to the first pad. Then, the branch section is located closer to a center of the insulating substrate than the first pad in a plan view.

15 Claims, 13 Drawing Sheets

DISPLAY APPARATUS

CROSS-REFERENCE TO RELATED APPLICATION

The present application claims priority from Japanese Patent Application No. 2016-13572 filed on Jan. 27, 2016, the content of which is hereby incorporated by reference into this application.

TECHNICAL FIELD OF THE INVENTION

The present invention relates to a display apparatus, and for example, relates to a display apparatus with a touch detection function capable of detecting proximity or contact of an object according to a change in capacitance.

BACKGROUND OF THE INVENTION

In recent years, a touch detection apparatus, so-called a touch panel, capable of detecting proximity or contact of an object has drawn attention. The touch panel is used for a display apparatus with a touch detection function mounted on or integrated with a display apparatus such as a liquid crystal display apparatus. In the display apparatus with a touch detection function, various button images and the like are displayed on the display apparatus, and thus, information can be input through the touch panel serving as an alternative to normal mechanical buttons. Since such a display apparatus with a touch detection function including such a touch panel does not require an input device such as a keyboard, a mouse, or a keypad, such display apparatuses tend to be broadly used not only for computers but also for personal digital assistants such as a mobile phone.

There are several types of touch detection apparatuses such as optical, resistive, and capacitive touch detection apparatuses. Among them, since a capacitive touch detection apparatus has a relatively simple structure and achieves low power consumption, the capacitive touch detection apparatus is used for a personal digital assistant or the like. For example, Japanese Patent Application Laid-Open Publication No. 2015-75605 discloses a display apparatus with a touch detection function including a capacitive touch panel.

SUMMARY OF THE INVENTION

Since a display function and a touch detection function are integrated in the above-described display apparatus with a touch function, for example, it is known that a drive electrode for display also serves as a drive electrode for touch detection. Therefore, a switching circuit for selectively driving drive electrodes is connected to the drive electrodes. This switching circuit needs to supply a predetermined voltage to a selected drive electrode and a predetermined voltage to non-selected drive electrodes, respectively, in touch detection.

For example, in a case where a plurality of drive electrodes extend in the longitudinal direction of a panel and are arranged in parallel to one another in the lateral direction, a voltage required in touch detection is supplied to each drive electrode from voltage supply lines arranged on the right side and the left side in the lateral direction of the panel via the switching circuit. Therefore, among the plurality of drive electrodes, drive electrodes closer to a center in the lateral direction of the panel have higher resistance, and time constants of the selected drive electrode and the non-selected drive electrodes tend to become worse. As a result, there is a problem that a touch detection property deteriorates due to the time constants.

An object of the present invention is to provide a display apparatus capable of improving a touch detection property due to a time constant.

According to an aspect of the present invention, a display apparatus has an insulating substrate, an optical element layer, a first electrode and a second electrode driving the optical element layer, and a drive circuit. The display apparatus further includes a first pad electrically connected to the drive circuit, a voltage supply line having one end electrically connected to the first pad, a common wire electrically connected to the voltage supply line and the second electrode, a transistor formed between the voltage supply line and the common wire, and a branch wire being a part of the voltage supply line, extending from a branch section, and electrically connected to the first pad. Then, the branch section is located closer to a center of the insulating substrate than the first pad in a plan view.

BRIEF DESCRIPTIONS OF THE DRAWINGS

Figure 12:
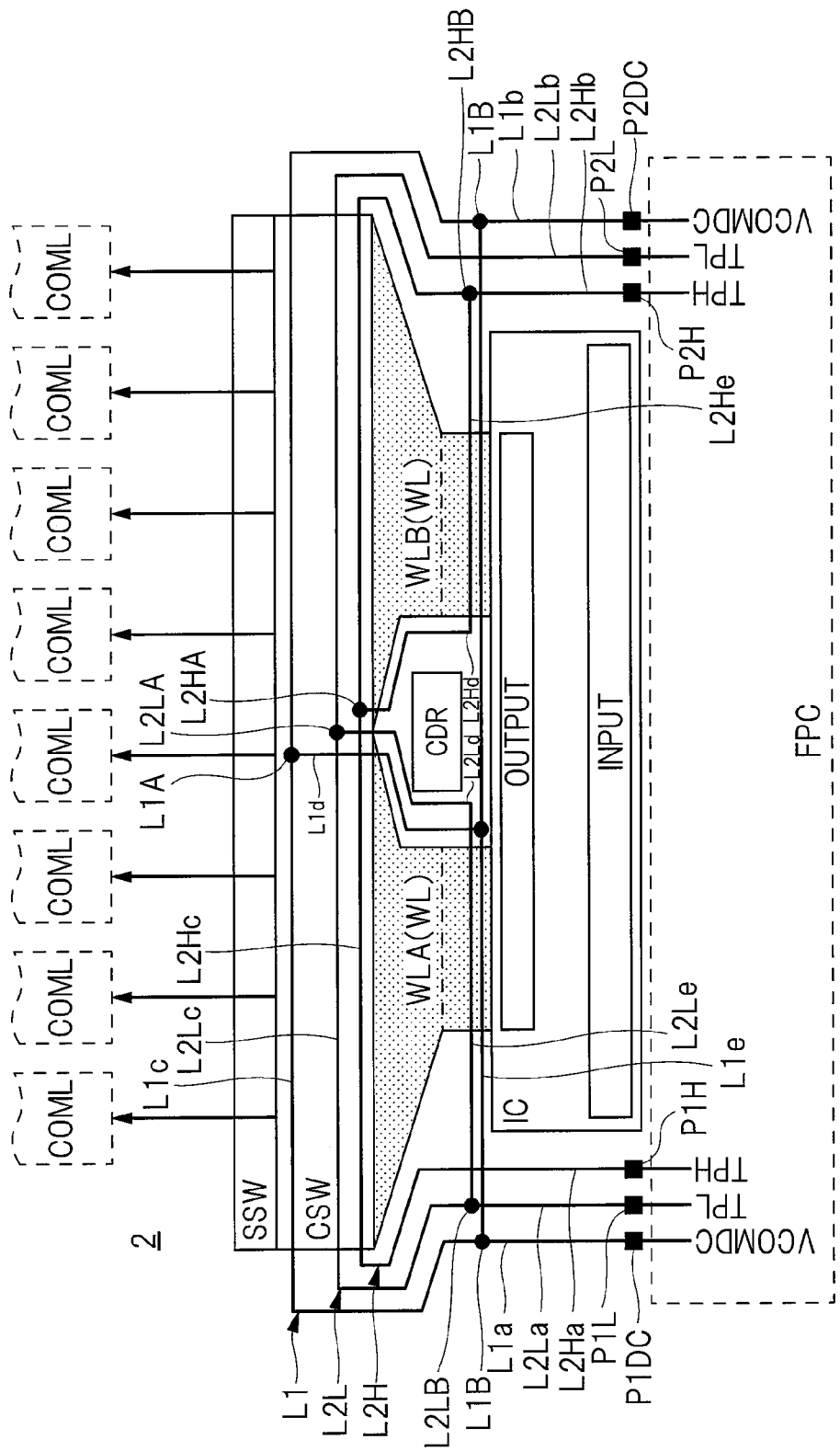
Figure 13:
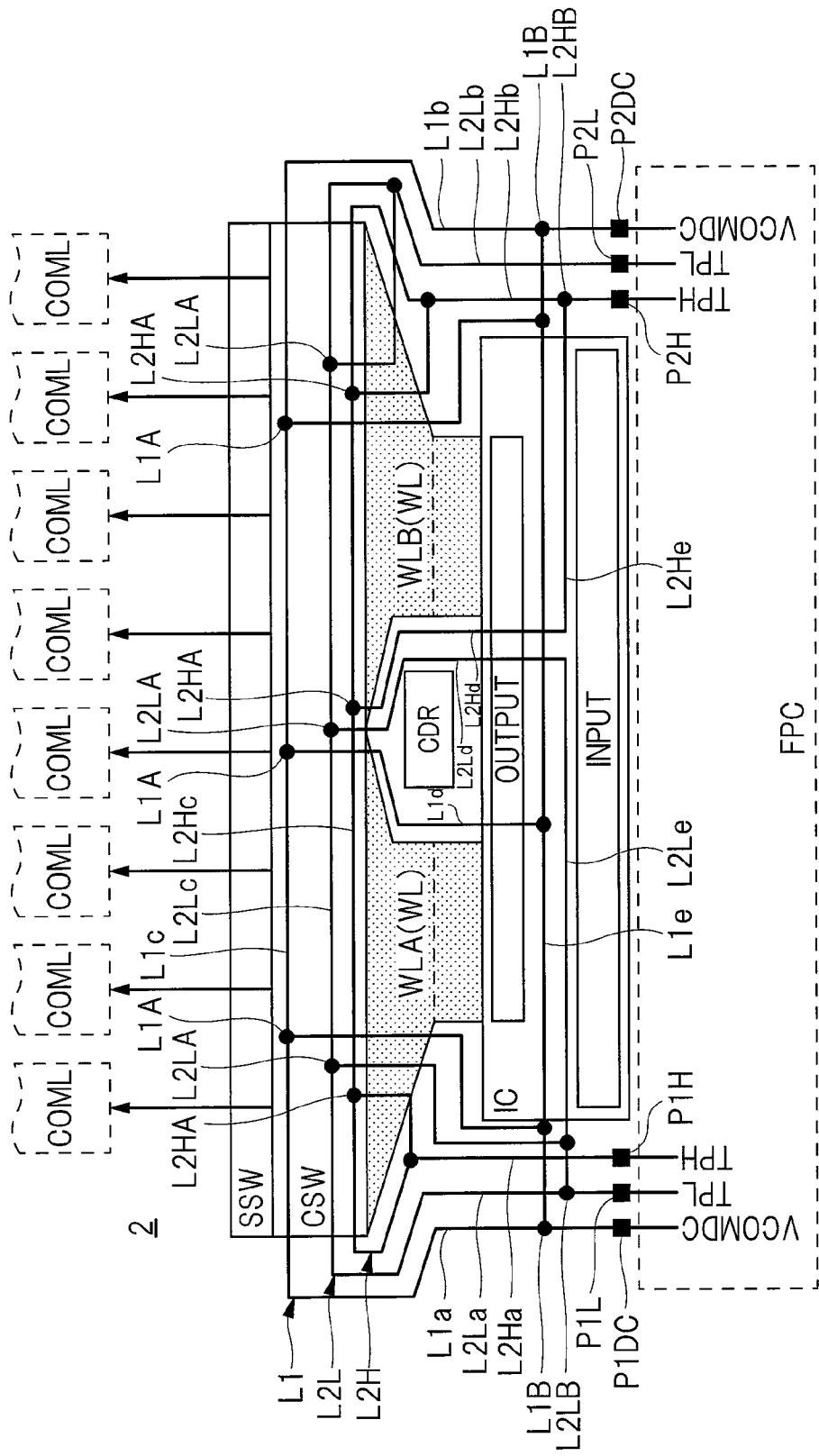

FIG. 12 is an explanatory diagram illustrating a fourth example of the power supply path of the drive electrode switching circuit in the display apparatus with a touch detection function according to the embodiment; and FIG. 13 is an explanatory diagram illustrating a fifth example of the power supply path of the drive electrode switching circuit in the display apparatus with a touch detection function according to the embodiment.

DESCRIPTIONS OF THE PREFERRED EMBODIMENTS

Hereinafter, embodiments of the present invention will be described in detail with reference to the accompanying drawings. Note that this disclosure is an example only and suitable modifications which can be easily conceived by those skilled in the art without departing from the gist of the present invention are included within the scope of the invention as a matter of course. In addition, in order to further clarify the description, a width, a thickness, a shape, and the like of respective portions may be schematically illustrated in the drawings as compared to aspects of the embodiments, but they are examples only and do not limit the interpretation of the present invention.

In addition, in this specification and the respective drawings, the same components described in the drawings which have been described before are denoted by the same reference characters, and detailed description thereof may be omitted as needed. Further, hatching which is applied in order to distinguish a structure is sometimes omitted in the drawings used in the embodiments depending on the drawing.

Embodiment

A technique to be described in the following embodiment can be widely applied to display apparatuses each including a mechanism of supplying a signal to a plurality of elements in a display region provided with an optical element layer from a peripheral region around the display region. Examples of the above display apparatus are various display apparatuses each including liquid crystal, an OLED (Organic Light Emitting Diode), a MEMS (Micro Electro Mechanical System) shutter, or the like as the optical element layer.

In the following embodiment, a liquid crystal display apparatus will be described as the display apparatus. However, the other application examples include all flat-panel display apparatuses such as an organic EL display apparatus and a self-luminous display apparatus other than the organic EL display apparatus.

Hereinafter, an example in which a liquid crystal display apparatus is applied to a display apparatus with a touch detection function will be described as an embodiment. Here, the display apparatus with a touch detection function is a liquid crystal display apparatus in which a detection electrode for touch detection is provided on one of a pixel substrate (also referred to as a transistor substrate or the like) and a counter substrate (also referred to as a color filter substrate or the like) included in the display apparatus. In addition, in the embodiment, an in-cell type display apparatus with a touch detection function having a feature that a drive electrode is further provided to operate as a drive electrode of a touch pane far end 1 will be described.

<Display Apparatus with Touch Detection Function>

Figure 1:
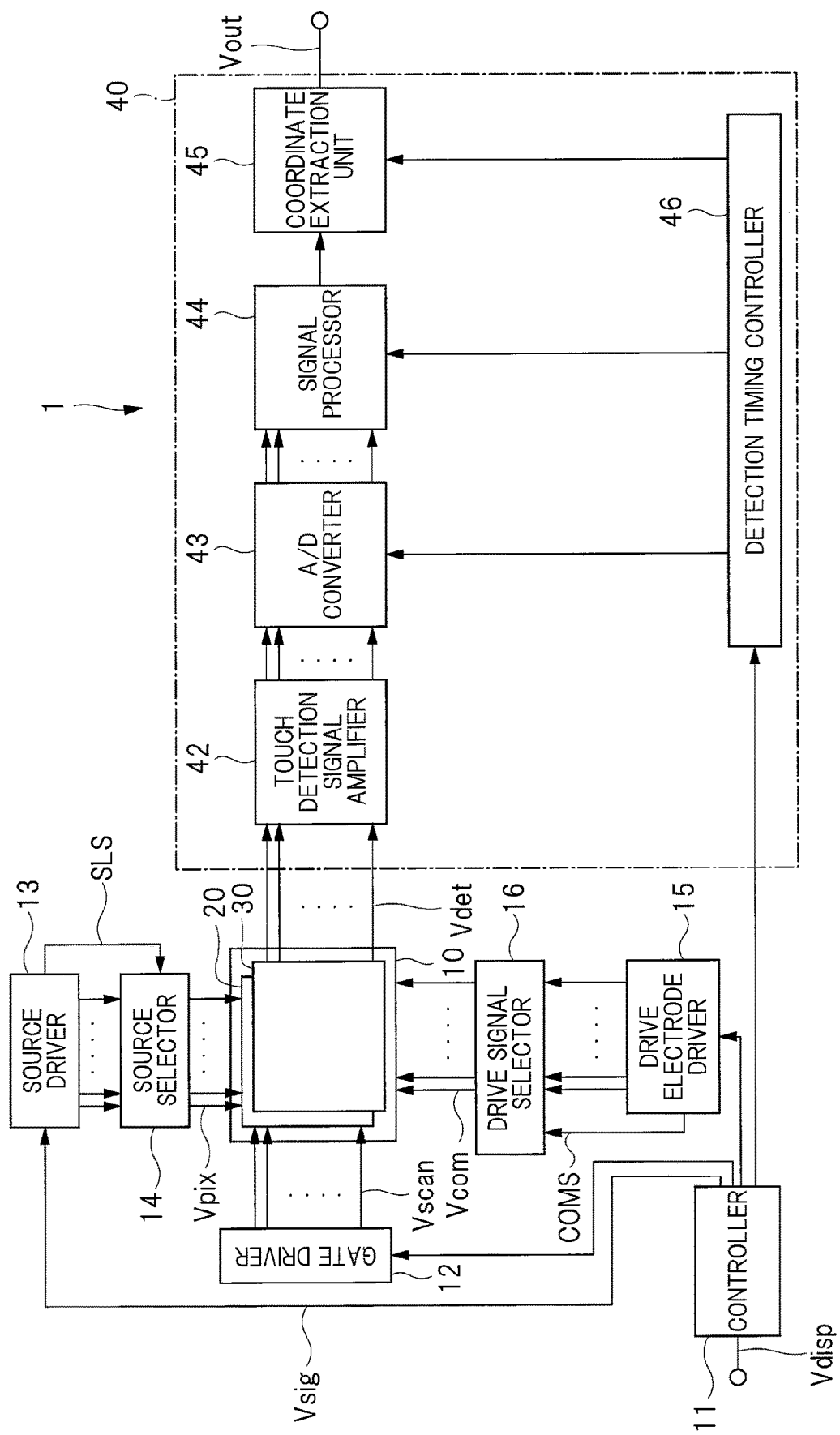
FIG. 1 is a block diagram illustrating an example of a schematic configuration of a display apparatus with a touch detection function according to an embodiment.

First, the configuration of the display apparatus with a touch detection function according to the present embodiment will be described with reference to FIG. 1. FIG. 1 is a block diagram illustrating an example of a schematic configuration of the display apparatus with a touch detection function according to the present embodiment.

A display apparatus 1 with a touch detection function includes a display device 10 with a touch detection function, a controller 11, a gate driver 12, a source driver 13, a source selector 14, a drive electrode driver 15, a drive signal selector 16, and a touch detector 40. The display apparatus 1 with a touch detection function is a display apparatus in which the display device 10 with a touch detection function incorporates a touch detection function.

The display device 10 with a touch detection function is a so-called in-cell type device in which a liquid crystal display device 20 including a liquid crystal display element as an optical element and a capacitive touch detection device 30 are integrated. Note that the display device 10 with a touch detection function may be a so-called on-cell type device in which the capacitive touch detection device 30 is mounted on the liquid crystal display device 20 including a liquid crystal display element as an optical element.

The liquid crystal display device 20 is a device performing display by sequentially scanning horizontal lines one by one according to a scan signal Vscan supplied from the gate driver 12.

The controller 11 is a circuit supplying a control signal to the gate driver 12, the source driver 13, the drive electrode driver 15, and the touch detector 40 according to a video signal Vdisp supplied from outside and causing the gate driver 12, the source driver 13, the drive electrode driver 15, and the touch detector 40 to operate in synchronization with one another.

The gate driver 12 has a function of sequentially selecting one horizontal line which is a target for display drive of the display device 10 with a touch detection function according to a control signal supplied from the controller 11.

The source driver 13 is a circuit supplying a pixel signal Vpix to each of pixels Pix (subpixels SPix) to be described later (FIG. 4) of the display device 10 with a touch detection function according to a control signal supplied from the controller 11. The source driver 13 generates a pixel signal obtained by time-division multiplexing the pixel signals Vpix of the plurality of subpixels SPix of the liquid crystal display device 20, and supplies the pixel signal to the source selector 14.

Figure 3:
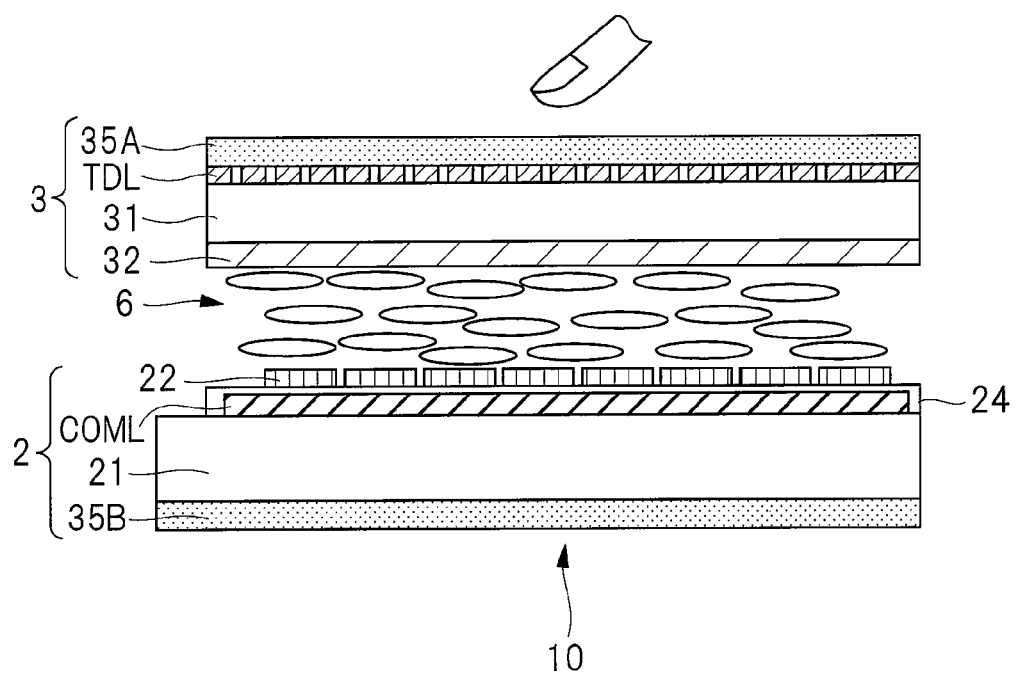
FIG. 3 is a cross-sectional view illustrating an example of a schematic cross-sectional structure of the display apparatus with a touch detection function according to the embodiment.

In addition, the source driver 13 generates a switch control signal SLS necessary for separating the pixel signal Vpix multiplexed into an image signal Vsig, and supplies the switch control signal SLS together with the pixel signal Vpix to the source selector 14. The source selector 14 performs multiplexer driving for supplying the pixel signal Vpix such that writing is sequentially performed for each subpixel SPix corresponding to each color of a color filter 32 to be described later (FIG. 3).

The drive electrode driver 15 is a circuit supplying a drive signal Vcom (an AC drive signal having an amplitude between a voltage TPL and a voltage TPH illustrated in FIGS. 7 and 8 and the like to be described later, or a DC voltage of a voltage VCOMDC) to a drive electrode COML to be described later (FIG. 2) of the display device 10 with a touch detection function according to a control signal supplied from the controller 11. The drive signal selector 16 selects the drive electrode COML to which drive signal Vcom is supplied according to a switch control signal COMS generated by the drive electrode driver 15.

The touch detection device 30 is a device which operates based on a principle of capacitive touch detection and outputs a touch detection signal Vdet.

The touch detection device 30 is configured to supply, to the drive electrode COML, the drive signal Vcom supplied from the drive electrode driver 15 via the drive signal selector 16 as a drive signal Vcom for touch detection (hereinafter also referred to as a touch drive signal Vcom), sequentially scan detection blocks one by one according to the touch drive signal Vcom, and perform touch detection.

The touch detection device 30 is configured to output the touch detection signal Vdet for each detection block from a plurality of touch detection electrodes TDL to be described later (FIG. 5), and supply the touch detection signal Vdet to the touch detector 40.

The touch detector 40 is a circuit which detects presence or absence of touch (proximity state or contact state) on the touch detection device 30 according to the control signal supplied from the controller 11 and the touch detection signal Vdet supplied from the touch detection device 30 of the display device 10 with a touch detection function, and determines coordinates of the touch in a touch detection region in a case where the touch is detected. The touch detector 40 includes a touch detection signal amplifier 42, an A/D (Analog to Digital) converter 43, a signal processor 44, a coordinate extraction unit 45, and a detection timing controller 46.

The touch detection signal amplifier 42 amplifies the touch detection signal Vdet supplied from the touch detection device 30. Note that the touch detection signal amplifier 42 may include a low-pass analog filter removing high-frequency components (noise components) included in the touch detection signal Vdet and extracting and outputting touch components, respectively.

The A/D converter 43 is a circuit which samples analog signals output from the touch detection signal amplifier 42, at a timing in synchronization with the drive signal Vcom and converts the analog signals into digital signals, respectively.

The signal processor 44 includes a digital filter which removes frequency components (noise components) included in output signals from the A/D converter 43 and higher than the frequency at which touch drive signal Vcom is sampled, and extracts the touch components. The signal processor 44 is a logic circuit which detects presence or absence of touch on the touch detection device 30 according to the output signals from the A/D converter 43.

The coordinate extraction unit 45 is a logic circuit which determines touch panel coordinates of touch when the touch is detected in the signal processor 44. The detection timing controller 46 causes the A/D converter 43, the signal processor 44, and the coordinate extraction unit 45 to operate in synchronization with one another. The coordinate extraction unit 45 outputs the touch panel coordinates as a signal output Vout.

Figure 2:
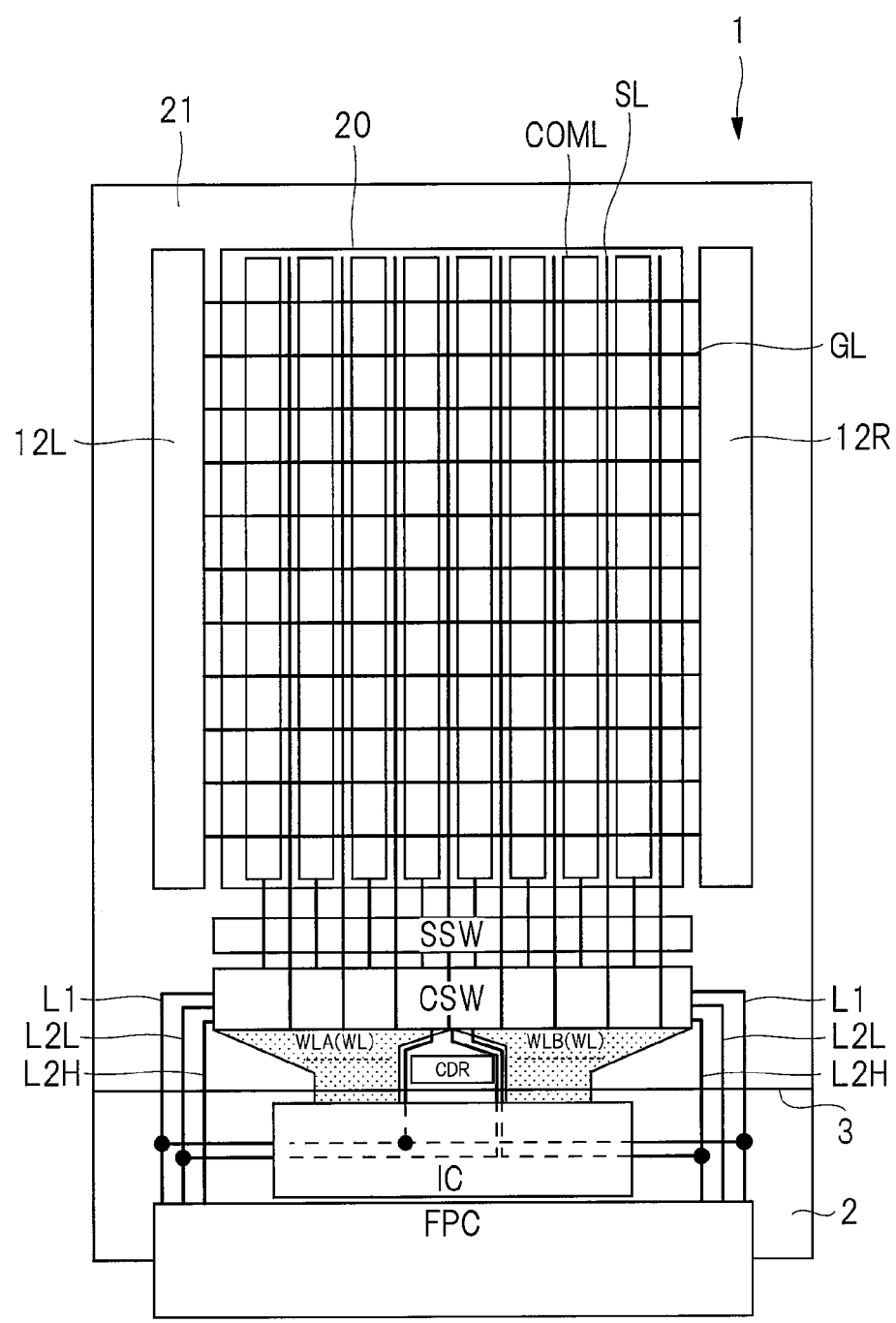
FIG. 2 is a diagram illustrating an example of a module mounted with the display apparatus with a touch detection function according to the embodiment.

FIG. 2 is a diagram illustrating an example of a module mounted with the display apparatus with a touch detection function according to the embodiment.

As illustrated in FIG. 2, the display apparatus 1 with a touch detection function includes the liquid crystal display device 20, gate drivers 12L and 12R, an RGB selection circuit SSW, a drive electrode switching circuit CSW, a drive electrode drive circuit CDR, and a driver chip IC. The RGB selection circuit SSW is included in the source selector 14 illustrated in FIG. 1. The drive electrode switching circuit CSW is included in the drive signal selector 16 illustrated in FIG. 1. The drive electrode drive circuit CDR is included in the drive electrode driver 15 illustrated in FIG. 1. The driver chip IC includes the controller 11, the source driver 13, and the like illustrated in FIG. 1.

The gate drivers 12L and 12R, the RGB selection circuit SSW, the drive electrode switching circuit CSW, and the drive electrode drive circuit CDR are formed on a TFT substrate 21, which is a glass substrate. The gate drivers 12L and 12R are formed on the left and the right (on long sides of the TFT substrate 21) across the liquid crystal display device 20 in a plan view, respectively. The gate driver 12L is formed on the left side, and the gate driver 12R is formed on the right side. The RGB selection circuit SSW, the drive electrode switching circuit CSW, and the drive electrode drive circuit CDR are formed on the lower side (on a short side of the TFT substrate 21) of the liquid crystal display device 20 in a plan view. On the lower side of the liquid crystal display device 20, the RGB selection circuit SSW, the drive electrode switching circuit CSW, and the drive electrode drive circuit CDR are arranged in this order.

The driver chip IC is an IC (Integrated Circuit) chip mounted on the TFT substrate 21, and incorporates circuits necessary for display operation such as the controller 11, the source driver 13, and the like illustrated in FIG. 1. The driver chip IC is mounted on the lower side of the drive electrode drive circuit CDR in a plan view. A portion of the TFT substrate 21 on which the driver chip IC is mounted may be referred to as a panel. Note that, in the display apparatus 1 with a touch detection function, the driver chip IC may incorporate a circuit such as the gate driver 12.

On the TFT substrate 21, the RGB selection circuit SSW is formed to be connected between video signal lines SL of the liquid crystal display device 20 and the driver chip IC. The drive electrode switching circuit CSW is formed to be connected to the drive electrodes COML.

The liquid crystal display device 20 of the display apparatus 1 with a touch detection function schematically illustrates the drive electrodes COML and scan signal lines GL formed to three-dimensionally intersect with the drive electrodes COML in the vertical direction (in a plan view) with respect to the front surface of the TFT substrate 21. In addition, the liquid crystal display device 20 schematically illustrates the drive electrodes COML and the video signal lines SL formed to extend in the direction parallel to the drive electrodes COML without intersecting with the drive electrodes COML in the vertical direction with respect to the front surface of the TFT substrate 21.

The drive electrodes COML are formed to extend in a long side direction (longitudinal direction) of the liquid crystal display device 20 and to be arrayed in parallel to one another in a short side direction (lateral direction) of the liquid crystal display device 20. The touch detection electrodes TDL to be described later (FIG. 5) are formed to extend in a short side direction of the display device 10 with a touch detection function and to be arrayed in parallel to one another in a long side direction of the display device 10. An output of the touch detection electrode TDL is connected to the touch detector 40 (see FIG. 1) mounted on the outside of the module via a terminal unit provided on the short side of the liquid crystal display device 20 and constituted by a flexible printed circuit board FPC and the like.

The flexible printed circuit board FPC is formed with voltage supply lines supplying power to the drive electrode switching circuit CSW formed on the TFT substrate 21. Although details of the voltage supply lines will be described later (FIGS. 7 and 8, and the like), the voltage supply lines include a first voltage supply line L1 (voltage VCOMDC), a second voltage supply line L2L (voltage TPL), and a second voltage supply line L2H (voltage TPH). Each of the voltage VCOMDC, the voltage TPL, and the voltage TPH is supplied to the drive electrode switching circuit CSW through the flexible printed circuit board FPC.

<Display Device with Touch Detection Function>

Figure 4:
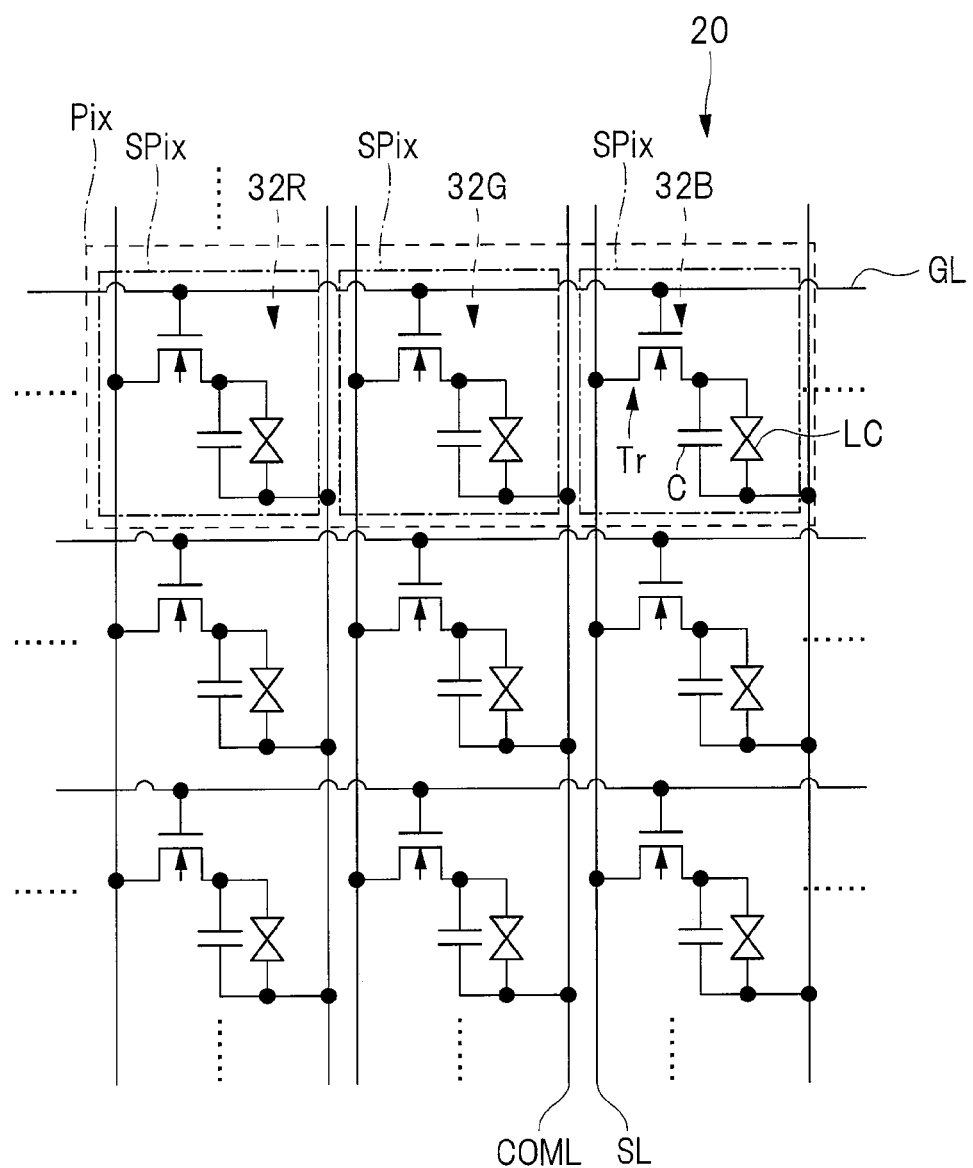
FIG. 4 is a circuit diagram illustrating an example of the pixel array of a liquid crystal display apparatus according to the embodiment.

Next, a configuration example of the above-described display device 10 with a touch detection function will be described in detail. FIG. 3 is a cross-sectional view illustrating an example of a schematic cross-sectional structure of the display device 10 with a touch detection function according to the present embodiment. FIG. 4 is a circuit diagram illustrating an example of the pixel array of the liquid crystal display device 20 according to the present embodiment.

As illustrated in FIG. 3, the display device 10 with a touch detection function includes a pixel substrate 2, a counter substrate 3 arranged to face the front surface of the pixel substrate 2 in the vertical direction, and a liquid crystal layer 6 interposed between the pixel substrate 2 and the counter substrate 3.

The liquid crystal layer 6 is composed of a plurality of liquid crystal molecules, and causes light passing through the liquid crystal layer 6 to be modulated according to the state of the electric field. Note that an alignment film may be arranged between the liquid crystal layer 6 and the pixel substrate 2, and between the liquid crystal layer 6 and the counter substrate 3, illustrated in FIG. 3.

The counter substrate 3 includes a glass substrate 31 and the color filter 32 formed on one surface (on a side of the liquid crystal layer 6) of the glass substrate 31. The touch detection electrodes TDL, which are detection electrodes of the touch detection device 30, are formed on the other surface of the glass substrate 31. A polarizer 35A is disposed on the touch detection electrodes TDL.

The pixel substrate 2 includes the TFT substrate 21 as a circuit board, a plurality of pixel electrodes 22 arranged in a matrix shape on the TFT substrate 21 (on the side of the liquid crystal layer 6), the plurality of drive electrodes COML formed between the TFT substrate 21 and the pixel electrodes 22, an insulating layer 24 insulating the pixel electrodes 22 and the drive electrodes COML from each other, and an incident-side polarizer 35B disposed on the lower surface side of the TFT substrate 21.

In the present embodiment, an FFS (Fringe Field Switching) mode in which a fringe electric field is generated between the pixel electrode 22 and the drive electrode COML, thereby causing liquid crystal molecules to rotate, is adopted; however, another horizontal electric field mode such as an IPS (In-Plane Switching) mode can be adopted. Note that a vertical electric field mode such as a TN (Twisted Nematic) mode, a VA (Vertical Alignment) mode, or the like may be adopted.

Each of the pixel electrode 22 and the drive electrode COML is formed of a light-transmissive conductive film such as an ITO (Indium Tin Oxide) film or the like.

A thin film transistor (TFT) element Tr of each subpixel SPix illustrated in FIG. 4, and wires such as the video signal line SL supplying the pixel signal Vpix to each pixel electrode 22 and the scan signal line GL driving each TFT element Tr are formed on the TFT substrate 21. The liquid crystal display device 20 illustrated in FIG. 4 has the plurality of subpixels SPix arrayed in a matrix shape. The subpixel SPix includes the TFT element Tr, the liquid crystal element LC, and a storage capacitor C. The TFT element Tr is constituted by a thin film transistor, and in this example, the TFT element Tr is constituted by an n-channel MOS (Metal Oxide Semiconductor) TFT. A source of the TFT element Tr is connected to the video signal line SL, a gate of the TFT element is connected to the scan signal line GL, and a drain of the TFT element is connected to one end of the liquid crystal element LC. One end of the liquid crystal element LC is connected to the drain of the TFT element Tr, and the other end of the liquid crystal element LC is connected to the drive electrode COML. The liquid crystal element LC is a display function layer which exhibits an image display function according to the pixel signal Vpix. One end of the storage capacitor C is connected to the drain of the TFT element Tr, and the other end of the storage capacitor C is connected to the drive electrode COML.

The subpixels SPix in the same row of the liquid crystal display device 20 are interconnected by the scan signal line GL. The scan signal line GL is connected to the gate driver 12, and the scan signal Vscan is supplied to the scan signal line GL from the gate driver 12. In addition, the subpixels SPix in the same column of the liquid crystal display device 20 are interconnected by the video signal line SL. The video signal line SL is connected to the source driver 13, and the pixel signal Vpix is supplied to the video signal line SL from the source driver 13. Furthermore, the subpixels SPix in the same column of the liquid crystal display device 20 are interconnected by the drive electrode COML. The drive electrode COML is connected to the drive electrode driver 15 via the drive signal selector 16, and the drive signal Vcom is supplied to the drive electrode COML from the drive electrode driver 15. That is, in this example, the plurality of subpixels SPix belonging to the same column are configured to share one drive electrode COML.

The gate driver 12 illustrated in FIG. 1 applies the scan signal Vscan to the gate of the TFT element Tr of the subpixel SPix via the scan signal line GL illustrated in FIG. 4 and thus sequentially selects one row (one horizontal line) of the subpixels SPix formed in a matrix shape in the liquid crystal display device 20 as a display drive target. The source driver 13 illustrated in FIG. 1 supplies the pixel signal Vpix to each of the subpixels SPix constituting one horizontal line sequentially selected by the gate driver 12 via the video signal line SL illustrated in FIG. 4. Then, in the selected subpixels SPix, display of one horizontal line is performed according to the supplied pixel signals Vpix. The drive electrode driver 15 illustrated in FIG. 1 applies the drive signal Vcom and drives the drive electrode COML illustrated in FIGS. 3 and 4, and the like.

As described above, the liquid crystal display device 20 drives the gate driver 12 such that the gate driver 12 performs line-sequential scanning of the scan signal line GL in a time-division manner, and thus, horizontal lines are sequentially selected one by one. In addition, the source driver 13 supplies the pixel signal Vpix to the subpixels SPix belonging to one horizontal line, and therefore, horizontal lines are displayed one by one in the liquid crystal display device 20. When this display operation is performed, the drive electrode driver 15 is configured to apply the drive signal Vcom for display to the drive electrodes COML corresponding to the target horizontal line. As described, the drive electrode COML functions as a common electrode of the liquid crystal display device 20 and also functions as a drive electrode of the touch detection device 30. In the following description, the drive signal Vcom as a display drive signal is also referred to as a display drive signal Vcom, and the drive signal Vcom as a touch drive signal is also referred to as a touch drive signal Vcom.

In the color filter 32 illustrated in FIG. 3, color regions of the color filter which are colored, for example, in three colors of red (R), green (G), and blue (B) are periodically arrayed, and color regions 32R, 32G, and 32B in three colors of R, G, and B are associated with the above-described subpixels SPix illustrated in FIG. 4 such that one set of the color regions 32R, 32G, and 32B constitutes the pixel Pix.

As described, the subpixel SPix can perform display in a single color. The color filter 32 faces the liquid crystal layer 6 in the direction vertical to the TFT substrate 21. Note that the color filter 32 may be a combination of other colors as long as the color filter 32 is colored in different colors. The color filter 32 may be omitted. As described, a region where there is no color filter, that is, a transparent subpixel may be provided.

The drive electrode COML according to the present embodiment functions as the drive electrode of the liquid crystal display device 20 and also functions as the drive electrode of the touch detection device 30. The drive electrode COML faces the pixel electrode 22 in the direction vertical to the front surface of the TFT substrate 21. The drive electrodes COML are arranged such that one drive electrode COML corresponds to one pixel electrode 22 (pixel electrode 22 constituting one column). In addition, the drive electrode COML extends in the direction in parallel to the direction in which the video signal line SL extends. Note that the drive electrode COML may extend in a direction different from the direction in which the above-described video signal line SL extends as long as the drive electrodes COML are divided such that each drive electrode COML has a width including at least one pixel (subpixel) in a plan view in the direction perpendicular to the direction in which the video signal line SL extends, that is, the direction in which the scan signal line GL extends.

Figure 5:
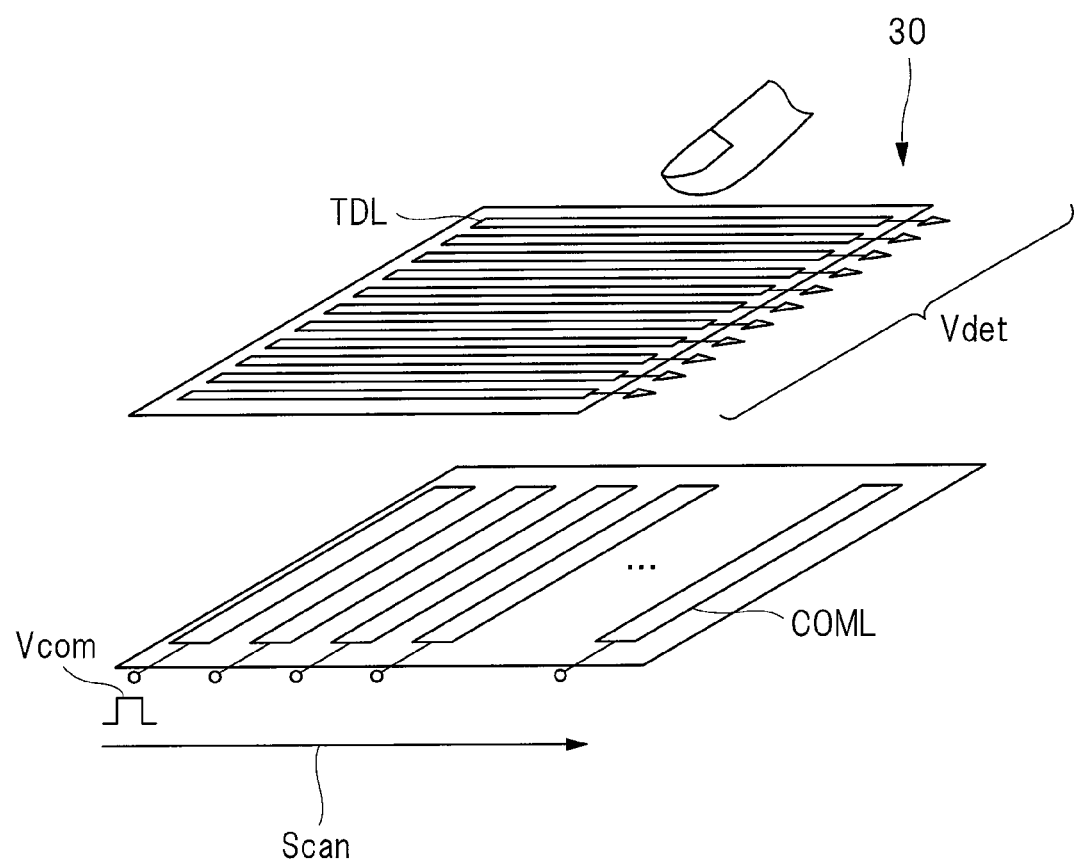
FIG. 5 is a perspective view illustrating examples of the configurations of drive electrodes and touch detection electrodes of a touch detection device according to the embodiment.

FIG. 5 is a perspective view illustrating examples of the configurations of the drive electrodes and the touch detection electrodes of the touch detection device 30 according to the present embodiment. As illustrated in FIG. 5, the touch detection device 30 is constituted by the touch detection electrodes TDL provided in the counter substrate 3, and the drive electrodes COML provided in the pixel substrate 2. In addition, the drive electrode COML is divided into a plurality of the drive electrodes having stripe-shaped electrode patterns extending in one direction. Note that the drive electrode COML is not necessarily divided into the plurality of drive electrodes each having a stripe shape. For example, the drive electrode COML may forma comb shape. Alternatively, the shape of the slit dividing the drive electrode COML may be linear or curved as long as the drive electrode COML is the plurality of divided electrodes. In addition, the drive electrode COML is divided such that the divided drive electrodes COML may each have a length equal to a width of the subpixel SPix displayed by the pixel electrode corresponding to the selected signal line, the width of the subpixel SPix being perpendicular to the direction in which the video signal line SL extends.

When a touch detection operation is performed, drive signal Vcom is sequentially supplied to each electrode pattern of the drive electrodes COML by the drive electrode driver 15 (drive electrode drive circuit CDR) and the drive signal selector 16 (drive electrode switching circuit CSW), and line-sequential scan driving is performed in a time-division manner. The touch detection electrodes TDL are constituted by stripe-shaped electrode patterns extending in a direction intersecting with the extending direction of the electrode pattern of the drive electrode COML. The touch detection electrode TDL faces the drive electrode COML in the direction vertical to the front surface of the TFT substrate 21. Each electrode pattern of the touch detection electrodes TDL is connected to an input of the touch detection signal amplifier 42 of the touch detector 40 (see FIG. 1). The electrode patterns of the drive electrodes COML and the touch detection electrodes TDL intersecting with each other generate capacitance at an intersecting portion where the electrode patterns intersect with each other.

With this configuration, when the touch detection device 30 performs a touch detection operation, the drive electrode driver 15 and the drive signal selector 16 illustrated in FIG. 1 are driven so as to perform line-sequential scanning in a time-division manner. For example, the drive electrode driver 15 and the drive signal selector 16 supply the drive signal Vcom (the AC drive signal having the amplitude between the voltage TPL and the voltage TPH illustrated in FIGS. 7 and 8 and the like to be described later) only to the selected drive electrode COML and do not supply the drive signal Vcom to the non-selected drive electrodes COML. The non-selected drive electrodes COML are set to a fixed potential (the DC voltage of the voltage VCOMDC in FIGS. 7 and 8 and the like to be described later). Therefore, each detection block (touch detection electrodes TDL) of the drive electrode COML is sequentially selected one by one in a scan direction Scan. The touch detection device 30 outputs the touch detection signal Vdet from the touch detection electrode TDL.

For example, the above-described drive electrode COML is divided into the plurality of drive electrodes so as to enable scanning in a direction different from the direction in which the video signal line SL extends. Due to this, the scan direction Scan is a direction different from the direction in which the video signal line SL extends. As described, the touch detection device 30 performs touch detection for each detection block. In addition, as illustrated in FIG. 5, the electrode patterns three-dimensionally intersecting with each other constitute a capacitive touch sensor in a matrix shape. Therefore, a location where an external object is brought into proximity or contact can also be detected by scanning the entire touch detection surface of the touch detection device 30.

<Power Supply Path of Drive Electrode Switching Circuit>

Figure 6:
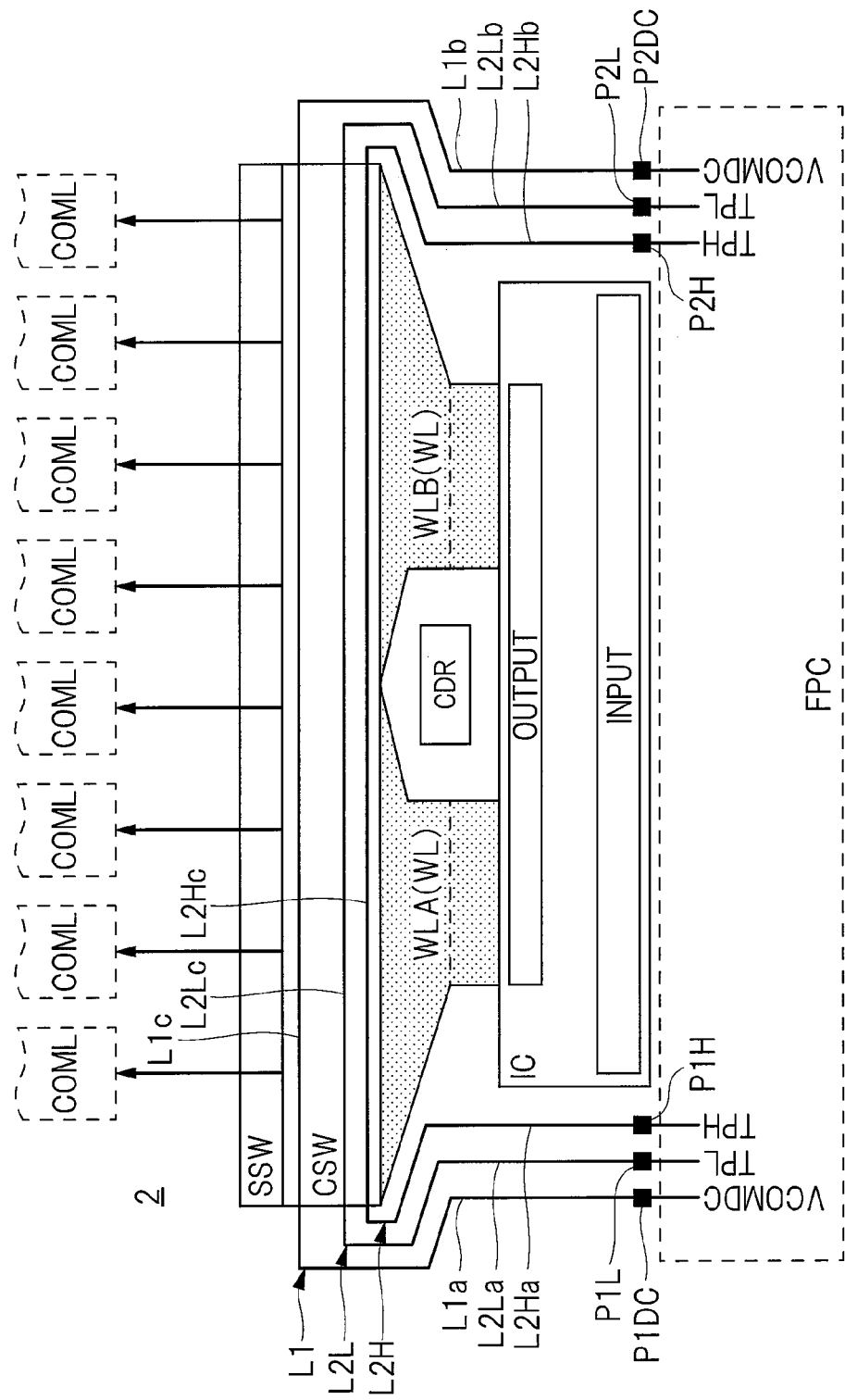
FIG. 6 is an explanatory diagram illustrating an example of a power supply path of a drive electrode switching circuit according to a comparative example with respect to the embodiment.

Next, the power supply path of the drive electrode switching circuit which is a feature of the display apparatus 1 with a touch detection function according to the present embodiment will be described. Here, for easy understanding of the feature of the display apparatus 1 with a touch detection function according to the present embodiment, the display apparatus 1 with a touch detection function according to the present embodiment will be described while being compared with a display apparatus with a touch detection function according to a comparative example with respect to the present embodiment. FIG. 6 is an explanatory diagram illustrating an example of the power supply path of the drive electrode switching circuit according to the comparative example with respect to the present embodiment.

Since the display function and the touch detection function are integrated in the display apparatus with a touch detection function according to the present embodiment, the drive electrode for display also serves as the drive electrode for touch detection. Therefore, the switching circuit CSW for selectively driving the respective drive electrodes COML is connected to the drive electrodes COML. This switching circuit CSW needs to supply a predetermined voltage to the selected drive electrode COML and a predetermined voltage to the non-selected electrodes COML, respectively, in touch detection.

Figure 8:
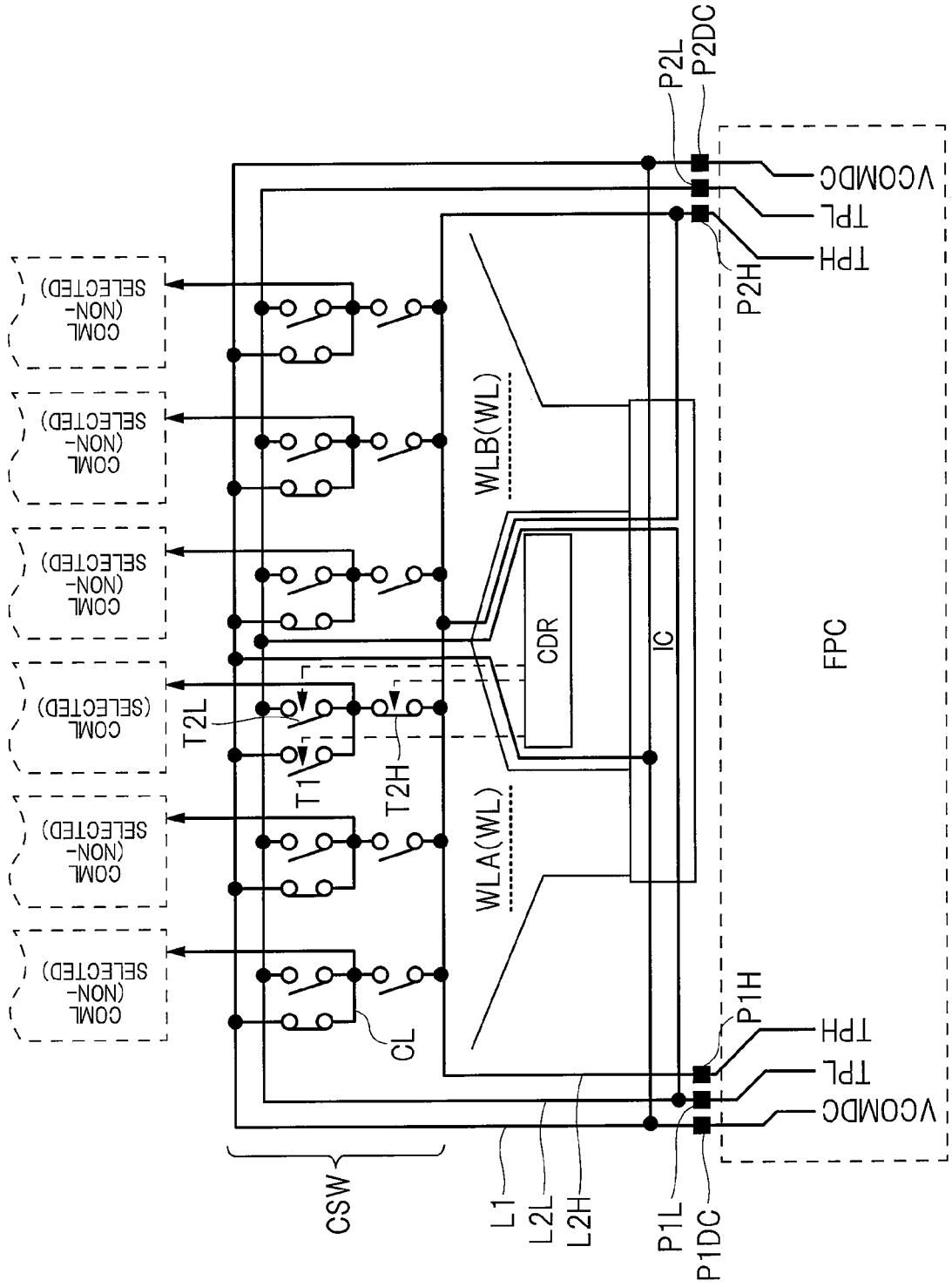
FIG. 8 is an explanatory diagram illustrating an example of the switching circuit for selectively driving drive electrodes in the display apparatus with a touch detection function according to the embodiment.

For example, in a case where the plurality of drive electrodes COML extend along the longitudinal direction (second direction) of a panel and are arranged in parallel to one another in the lateral direction (first direction) in a plan view as illustrated in FIG. 6, which illustrates a comparative example with respect to the present embodiment, the switching circuit CSW is arranged such that each switch constituting the switching circuit CSW can be electrically connected to the lower end of each drive electrode COML (see FIG. 8 to be described later). The switches of the switching circuit CSW are arranged in parallel to one another in the lateral direction by following the arrangement of the drive electrodes COML. That is, in FIG. 6, a peripheral region is disposed on the lower side of a pixel region (display region) where the plurality of drive electrodes COML are arranged, the switching circuit CSW is arranged in the peripheral region, and a driver chip IC is arranged on the lower side of the switching circuit CSW. Furthermore, a flexible printed circuit board FPC is arranged on the lower side of the driver chip IC.

In such a configuration, in the comparative example with respect to the present embodiment, in a plan view in FIG. 6, a voltage necessary in touch detection is input from the flexible printed circuit board FPC and is supplied to each drive electrode COML via the right and left sides of each of a first voltage supply line L1 (voltage VCOMDC), a second voltage supply line L2L (voltage TPL), and a second voltage supply line L2H (voltage TPH), which are arranged on the right and left sides in the lateral direction of the panel, through the switching circuit CSW. Therefore, among the plurality of drive electrodes COML, the drive electrode COML arranged closer to a center in the lateral direction of the panel has higher resistance. Thus, time constants of the selected drive electrode and the non-selected drive electrodes COML tend to become worse. As a result, there is a problem that a touch detection property deteriorates due to the time constants.

That is, time constant $\tau$ is expressed as a product of resistance R and capacitance C ($\tau=R\times C$) and becomes larger in proportion to a resistance value. Therefore, in the comparative example illustrated in FIG. 6, resistance of the power supply becomes higher toward the center in the lateral direction of the panel, and a touch detection property deteriorates due to insufficient value of the time constant. The deterioration in touch detection property occurs in both the selected drive electrode COML and the non-selected drive electrodes COML. This phenomenon becomes apparent as dimensions of the panel becomes larger, or as a resolution of the panel is improved.

In view of the foregoing, the display apparatus with a touch detection function according to the present embodiment solves the problem of the display apparatus with a touch detection function according to the comparative example and enables improvement of the touch detection property due to the time constants. Hereinafter, each example of the power supply path of the drive electrode switching circuit in the display apparatus with a touch detection function according to the present embodiment will be described.

<First Example of Power Supply Path of Drive Electrode Switching Circuit>

Figure 7:
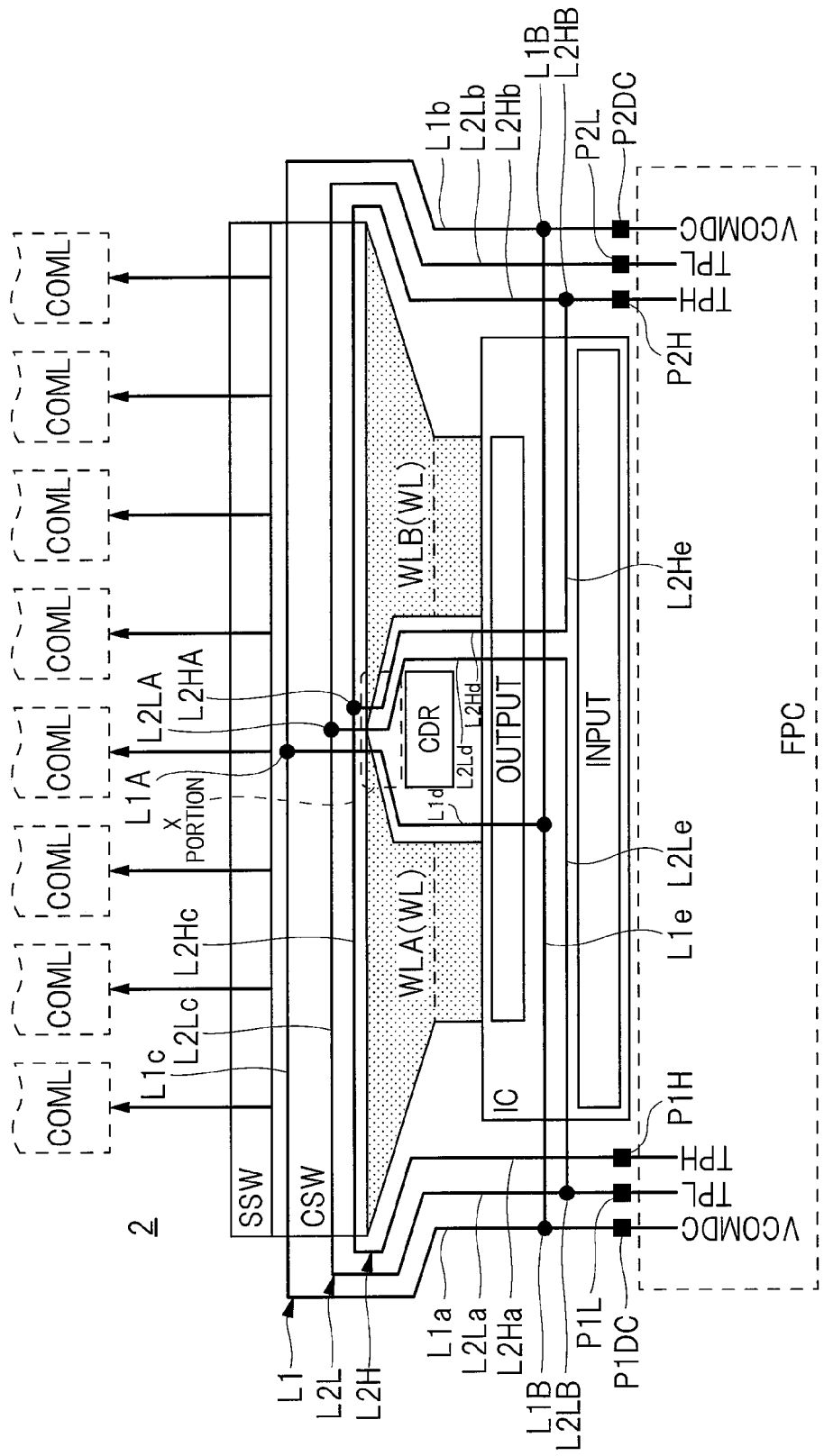
FIG. 7 is an explanatory diagram illustrating a first example of a power supply path of a drive electrode switching circuit in the display apparatus with a touch detection function according to the embodiment.
Figure 9:
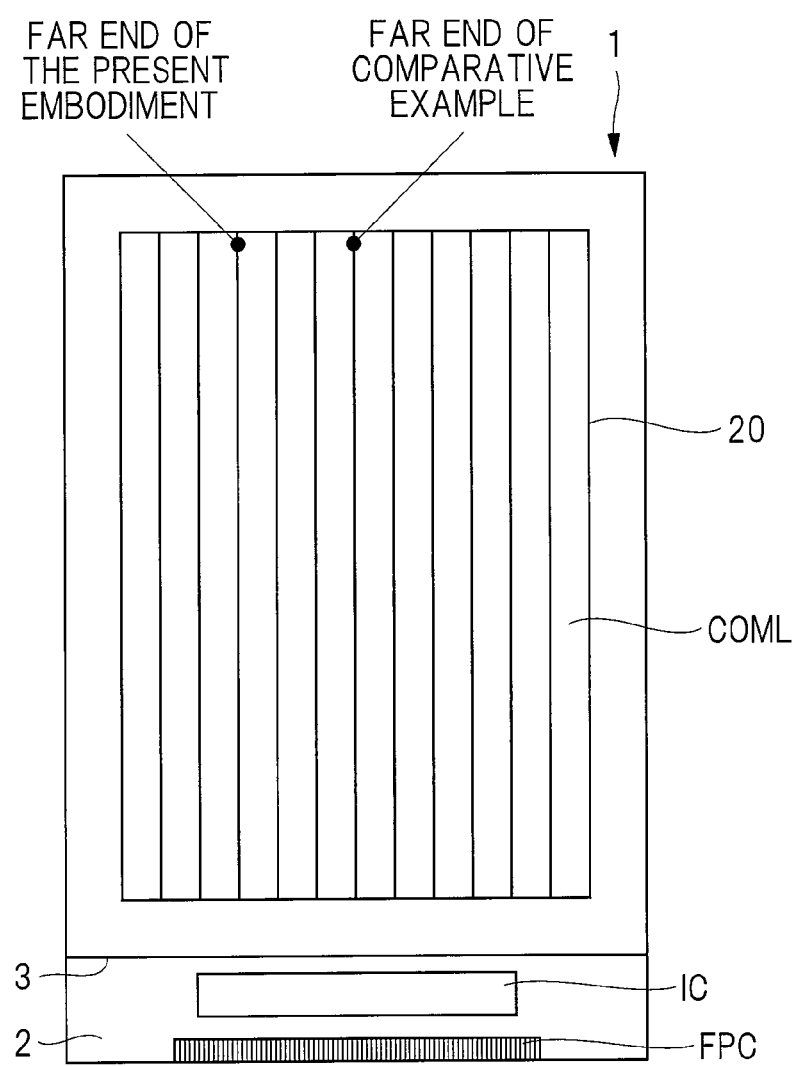
FIG. 9 is an explanatory diagram for comparing a far end of the drive electrodes in the embodiment with that in the comparative example.

FIG. 7 is an explanatory diagram illustrating a first example of the power supply path of the drive electrode switching circuit in the display apparatus with a touch detection function according to the present embodiment. FIG. 8 is an explanatory diagram illustrating an example of the switching circuit for selectively driving the drive electrodes. FIG. 9 is an explanatory diagram for comparing a far end of the drive electrodes in the present embodiment with that in the comparative example.

As illustrated in FIGS. 7 and 8 (see also FIGS. 1 to 5 and the like), the display apparatus with a touch detection function according to the present embodiment includes an insulating substrate (pixel substrate 2), the optical element layer (liquid crystal layer 6), first electrodes (pixel electrodes 22) driving the optical element layer, and second electrodes (drive electrodes COML), and a drive circuit (flexible printed circuit board FPC or driver chip IC). This display apparatus includes first pads P1DC, P1L, and P1H, second pads P2DC, P2L, and P2H, and the first voltage supply line L1, the second voltage supply line L2L, and the second voltage supply line L2H, which are voltage supply lines, common wires CL, transistors T1, T2L, and T2H, and branch wires.

The first pads P1DC, P1L, and P1H, and the second pads P2DC, P2L, and P2H are electrically connected to the flexible printed circuit board FPC or the driver chip IC which is a drive circuit. Here, the first pads P1DC, P1L, and P1H, and the second pads P2DC, P2L, and P2H are electrically connected to the flexible printed circuit board FPC. In a connecting part between the first and second pads and the flexible printed circuit board FPC, the first pads P1DC, P1L, and P1H are arranged on the left side in the lateral direction (first direction) of the panel, and the second pads P2DC, P2L, and P2H are arranged on the right side in the lateral direction of the panel.

One ends of the first voltage supply line L1, the second voltage supply line L2L, and the second voltage supply line L2H, which are voltage supply lines, are electrically connected to the first pads P1DC, P1L, and P1H, respectively, and the other ends of the voltage supply lines are electrically connected to the second pads P2DC, P2L, and P2H, respectively. The branch wires are part of the first voltage supply line L1, the second voltage supply line L2L, and the second voltage supply line L2H, extend from branch sections L1A, L2LA, and L2HA, and are electrically connected to the first pads P1DC, P1L, and P1H. A common wire CL is electrically connected to the first voltage supply line L1, the second voltage supply line L2L, the second voltage supply line L2H, and the drive electrode COML which is the second electrode. Note that, in the present specification, from among two portions L1A and L1B where the first voltage supply line is branched, L1A is referred to as the branch section, and L1B is referred to as a merging section; however, this distinction is for the sake of explanation only, and L1B may be referred to as the branch section, and L1A may be referred to as the merging section. The same applies to the second voltage supply lines.

The transistor T1 is formed between and the first voltage supply line L1 and the common wire CL, the transistor T2L is formed between the second voltage supply line L2L and the common wire CL, and the transistor T2H is formed between the second voltage supply line L2H and the common wire CL. Each of the transistors T1, T2L, and T2H functions as a switch of the switching circuit CSW. For example, each of the transistors T1, T2L, and T2H is constituted by a thin-film transistor similarly to the TFT element Tr constituting a pixel.

Furthermore, as illustrated in FIGS. 7 and 8 (see also FIGS. 1 to 5 and the like), the display apparatus with a touch detection function according to the present embodiment includes the plurality of video signal lines SL, a plurality of lead-out wires WL, the drive electrode drive circuit CDR which is a second electrode drive circuit, and the driver chip IC.

The plurality of video signal lines SL are formed in the pixel region. The plurality of lead-out wires WL are formed in the peripheral region. One of the plurality of lead-out wires WL is electrically connected to one of the plurality of video signal lines SL. The plurality of lead-out wires WL include a first lead-out wire group WLA and a second lead-out wire group WLB. One ends of the first lead-out wire group WLA and the second lead-out wire group WLB are connected to the driver chip IC, and the other ends of the lead-out wire groups are connected to the RGB selection circuit SSW. In the first lead-out wire group WLA and the second lead-out wire group WLB, the connection part between the first lead-out wire group WLA and the driver chip IC is arranged on the left side in the lateral direction (first direction) of the panel, and the connection part between the second lead-out wire group WLB and the driver chip IC is arranged on the right side in the lateral direction of the panel.

The drive electrode drive circuit CDR drives the transistors T1, T2L, and T2H. The drive electrode drive circuit CDR is arranged between the first lead-out wire group WLA and the second lead-out wire group WLB. The plurality of lead-out wires WL are electrically connected to the driver chip IC.

In the display apparatus with a touch detection function according to the present embodiment, the drive electrode COML which is the second electrode functions as a display electrode displaying an image, and a detection electrode detecting proximity or contact of an object. The first voltage supply line L1 from among the voltage supply lines is a wire supplying a DC voltage of the voltage VCOMDC during a display period in which the drive electrode COML functions as the display electrode.

The second voltage supply line L2L and the second voltage supply line L2H are wires supplying voltages TPL and TPH during a touch detection period in which the drive electrode COML functions as the detection electrode. The voltage TPL is relatively low, and the voltage TPH is relatively high. The second voltage supply line L2L supplies the voltage TPL, and the second voltage supply line L2H supplies the voltage TPH. Accordingly, the AC drive signal having the amplitude between the voltage TPL and the voltage TPH is generated. Here, a description has been given of a case where the AC drive signal having the amplitude between the voltage TPL and the voltage TPH is generated by using the second voltage supply line L2L and the second voltage supply line L2H; however, the AC drive signal can be supplied by a single voltage supply line.

In the first example of the power supply path of the drive electrode switching circuit illustrated in FIGS. 7 and 8, with respect to three types of power supplies, the first voltage supply line L1 (voltage VCOMDC), the second voltage supply line L2L (voltage TPL), and the second voltage supply line L2H (voltage TPH) arranged on the right and left sides in the lateral direction (first direction) of the panel in a plan view, in addition to the power supply paths from both the right side and the left side as in the comparative example illustrated in FIG. 6, a power supply path is also provided where branch wires of the three types of power supplies are led in from the right and left sides in the lateral direction of the driver chip IC, the branch wires are routed under the driver chip IC, the branch wires are led out from the central portion of the driver chip IC, and power is input to the central part of the switching circuit CSW.

In the example illustrated in FIGS. 7 and 8, with respect to the first voltage supply line L1, a power supply path is added where branch wires are led in from both the right side and the left side in the lateral direction of the driver chip IC and routed under the driver chip IC and then are merged, the merged wire passes on the left side of the drive electrode drive circuit CDR and is led out from the central portion of the drive electrode drive circuit CDR, and power is input to the central part of the switching circuit CSW. With respect to the second voltage supply line L2L, a power supply path is added where a branch wire is led in from the left side in the lateral direction of the driver chip IC, is routed under the driver chip IC, passes on the right side of the drive electrode drive circuit CDR, and is led out from the central portion of the drive electrode drive circuit CDR, and power is input to the central part of the switching circuit CSW. With respect to the second voltage supply line L2H, a power supply path is added where a branch wire is led in from the right side in the lateral direction of the driver chip IC, is routed under the driver chip IC, passes on the right side of the drive electrode drive circuit CDR, and is led out from the central portion of the drive electrode drive circuit CDR, and power is input to the central part of the switching circuit CSW.

Specifically, the first voltage supply line L1 (voltage VCOMDC) includes an a-wire section L1a, a b-wire section L1b, a c-wire section L1c, a d-wire section L1d, and an e-wire section L1e. From among the wire sections, the d-wire section L1d and the e-wire section L1e constitute a branch wire which is part of the first voltage supply line L1.

One end of the a-wire section L1a is connected to the first pad P1DC, and the a-wire section L1a extends from the first pad P1DC in the longitudinal direction which is the second direction. The merging section L1B of the branch wire is provided at the a-wire section L1a. One end of the b-wire section L1b is connected to the second pad P2DC, and the b-wire section L1b extends from the second pad P2DC in the longitudinal direction. The merging section L1B of the branch wire is provided at the b-wire section L1b.

The c-wire section L1c extends in the lateral direction, which is the first direction. One end of the c-wire section L1c is connected to the other end of the a-wire section L1a, and the other end of the c-wire section L1c is connected to the other end of the b-wire section L1b. The c-wire section L1c is formed between the a-wire section L1a and the b-wire section L1b. The c-wire section L1c is connected to the transistors T1 functioning as switches of the switching circuit CSW. The branch section L1A is provided at the central part in the lateral direction of the c-wire section L1c.

The c-wire section L1c is larger in width or thickness and is lower in resistance than each of the a-wire section L1a and the b-wire section L1b. In a case where resistance of the c-wire section L1c is set to be low, since the c-wire section L1c extends long in the lateral direction, resistance of the first voltage supply line L1 greatly lowers, and the time constant of the first voltage supply line L1 is improved.

The d-wire section L1d extends in the longitudinal direction from the branch section L1A of the c-wire section L1c. One end of the d-wire section L1d is connected to the branch section L1A of the c-wire section L1c, and the other end of the d-wire section L1d is connected to one end of the e-wire section L1e. The d-wire section L1d extends from the branch section L1A, passes on the left side of the drive electrode drive circuit CDR, and is joined to the e-wire section L1e. The e-wire section L1e extends in the lateral direction. One end of the e-wire section L1e is connected to the other end of the d-wire section L1d, another end of the e-wire section L1e is connected to the merging section L1B of the a-wire section L1a, and the other end of the e-wire section L1e is connected to the merging section L1B of the b-wire section L1b. The e-wire section L1e is arranged under the driver chip IC.

In the first voltage supply line L1, the branch section L1A is arranged closer to a center of the pixel substrate 2 which is an insulating substrate, than the first pad P1DC and the second pad P2DC in a plan view. Accordingly, the number of power supply paths for the drive electrodes COML is increased to three, that is, the paths are disposed on the right side, the left side, and the center of the pixel substrate 2. Thus, as illustrated in FIG. 9, the far end (portion where the time constant is largest) of the drive electrode COML is located at the center in the lateral direction of the pixel substrate 2 in the comparative example with respect to the present embodiment; however, the far end is shifted in the lateral direction in the present embodiment. As a result, it is possible to lower the time constant of the power supply line.

In addition, the plurality of lead-out wires WL include the first lead-out wire group WLA and the second lead-out wire group WLB at the connection sections between the lead-out wires WL and the driver chip IC. The d-wire section L1d of the branch wire of the first voltage supply line L1 extends in the region between the first lead-out wire group WLA and the second lead-out wire group WLB.

In addition, the first lead-out wire group WLA is disposed between the a-wire section L1a and the d-wire section L1d. A width of the d-wire section L1d is larger than a width of the a-wire section L1a. Similarly, the second lead-out wire group WLB is disposed between the b-wire section L1b and the d-wire section L1d. The width of the d-wire section L1d is larger than a width of the b-wire section L1b. Here, the widths of the wire sections in a plan view are defined; however, thicknesses in cross-sectional view can be defined. In a case of defining each thickness, a structure is adopted where a thickness of the d-wire section L1d is set to be larger than a thickness of the a-wire section L1a and a thickness of the b-wire section L1b. As described, by adopting a structure where the width or the thickness, or both the width and the thickness of the d-wire section L1d is or are larger, it is possible to lower the resistance of the power supply. In addition, when the width of the d-wire section L1d is set to be larger, the widths of the a-wire section L1a and the b-wire section L1b can be set to be smaller, which is advantageous for narrowing the frame of the lower side (driver region).

In addition, the drive electrode drive circuit CDR driving the transistors T1 functioning as switches of the switching circuit CSW is formed in the region between the first lead-out wire group WLA and the second lead-out wire group WLB.

Also, the branch wire of the first voltage supply line L1 includes the e-wire section L1e overlapping with the driver chip IC in a plan view. A width of the e-wire section L1e is larger than the width of the a-wire section L1a. Similarly, the width of the e-wire section L1e is larger than the width of the b-wire section L1b. Here, the widths of the wire sections in a plan view are defined; however, thicknesses in cross-sectional view can be defined. In the case of defining each thickness, a structure is adopted where a thickness of the e-wire section L1e is larger than a thickness of the a-wire section L1a and a thickness of the b-wire section L1b. By adopting such a structure, it is possible to lower the resistance of the power supply. In addition, when the width of the e-wire section L1e is set to be larger, the widths of the a-wire section L1a and the b-wire section L1b can be set to be smaller, which is advantageous for narrowing the frame of the lower side (driver region).

Next, the second voltage supply line L2L (voltage TPL) will be described below. The second voltage supply line L2L includes an a-wire section L2La, a b-wire section L2Lb, a c-wire section L2Lc, a d-wire section L2Ld, and an e-wire section L2Le. From among the wire sections, the d-wire section L2Ld and the e-wire sections L2Le constitute a branch wire which is part of the second voltage supply line L2L.

One end of the a-wire section L2La is connected to the first pad P1L, and the a-wire section L2La extends from the first pad P1L in the longitudinal direction which is the second direction. A merging section L2LB of the branch wire is provided at the a-wire section L2La. One end of the b-wire section L2Lb is connected to the second pad P2L, and the b-wire section L2Lb extends from the second pad P2L in the longitudinal direction.

The c-wire section L2Lc extends in the lateral direction which is the first direction. One end of the c-wire section L2Lc is connected to the other end of the a-wire section L2La, and the other end of the c-wire section L2Lc is connected to the other end of the b-wire section L2Lb. The c-wire section L2Lc is formed between the a-wire section L2La and the b-wire section L2Lb. The c-wire section L2Lc is connected to the transistors T2L functioning as switches of the switching circuit CSW. The branch section L2LA is provided in the central part in the lateral direction of the c-wire section L2Lc.

The c-wire section L2Lc is larger in width or thickness and is lower in resistance than each of the a-wire section L2La and the b-wire section L2Lb. In a case where resistance of the c-wire section L2Lc is set to be low, since the c-wire section L2Lc extends long in the lateral direction, resistance of the second voltage supply line L2 greatly lowers, and the time constant of the second voltage supply line L2 is improved.

The d-wire section L2Ld extends in the longitudinal direction from the branch section L2LA of the c-wire section L2Lc. One end of the d-wire section L2Ld is connected to the branch section L2LA of the c-wire section L2Lc, and the other end of the d-wire section L2Ld is connected to one end of the e-wire section L2Le. The d-wire section L2Ld extends from the branch section L2LA, passes on the right side of the drive electrode drive circuit CDR, and is joined to the e-wire section L2Le. The e-wire section L2Le extends in the lateral direction. One end of the e-wire section L2Le is connected to the other end of the d-wire section L2Ld, and the other end of the e-wire section L2Le is connected to the merging section L2LB of the a-wire section L2La. The e-wire section L2Le is arranged under the driver chip IC.

Also in the second voltage supply line L2L, similarly to the first voltage supply line L1, the branch section L2LA is arranged closer to the center of the pixel substrate 2 which is an insulating substrate, than the first pad P1L and the second pad P2L in a plan view.

In addition, the d-wire section L2Ld of the branch wire of the second voltage supply line L2L extends in the region between the first lead-out wire group WLA and the second lead-out wire group WLB. A structure is adopted where a width (or a thickness or both of them) of the d-wire section L2Ld is (are) larger than a width (or a thickness or both of them) of each of the a-wire section L2La and the b-wire section L2Lb.

In addition, the drive electrode drive circuit CDR driving the transistors T2L functioning as switches of the switching circuit CSW is formed in the region between the first lead-out wire group WLA and the second lead-out wire group WLB.

In addition, the branch wire of the second voltage supply line L2L includes the e-wire section L2Le overlapping with the driver chip IC in a plan view. A structure is adopted where a width (or a thickness or both of them) of the e-wire section L2Le is (are) larger than the width (or the thickness or both of them) of each of the a-wire section L2La and the b-wire section L2Lb. By adopting such a structure, the same effects as in the first voltage supply line L1 can also be obtained in the second voltage supply line L2L.

Next, the second voltage supply line L2H (voltage TPH) will be described below. The second voltage supply line L2H includes an a-wire section L2Ha, a b-wire section L2Hb, a c-wire section L2Hc, and a d-wire section L2Hd, and an e-wire section L2He. Among them, the d-wire section L2Hd and the e-wire section L2He constitute a branch wire which is part of the second voltage supply line L2H.

One end of the a-wire section L2Ha is connected to the first pad P1H, and the a-wire section L2Ha extends from the first pad P1H in the longitudinal direction which is the second direction. One end of the b-wire section L2Hb is connected to the second pad P2H, and the b-wire section L2Hb extends from the second pad P2H in the longitudinal direction. A merging section L2HB of the branch wire is provided at the b-wire section L2Hb.

The c-wire section L2Hc extends in the lateral direction which is the first direction. One end of the c-wire section L2Hc is connected to the other end of the a-wire section L2Ha, and the other end of the c-wire section L2Hc is connected to the other end of the b-wire section L2Hb. The c-wire section L2Hc is formed between the a-wire section L2Ha and the b-wire section L2Hb. The c-wire section L2Hc is connected to the transistors T2H functioning as switches of the switching circuit CSW. A branch section L2HA is provided in the central part in the lateral direction of the c-wire section L2Hc.

The d-wire section L2Hd extends in the longitudinal direction from the branch section L2HA of the c-wire section L2Hc. One end of the d-wire section L2Hd is connected to the branch section L2HA of the c-wire section L2Hc, and the other end of the d-wire section L2Hd is connected to one end of the e-wire section L2He. The d-wire section L2Hd extends from the branch section L2HA, passes on the right side of the drive electrode drive circuit CDR, and is joined to the e-wire section L2He. The e-wire section L2He extends in the lateral direction. One end of the e-wire section L2He is connected to the other end of the d-wire section L2Hd, and the other end of the e-wire section L2He is connected to the merging section L2HB of the b-wire section L2Hb. The e-wire section L2He is arranged under the driver chip IC.

Also in the second voltage supply line L2H, similarly to the first voltage supply line L1, the branch section L2HA is arranged closer to the center of the pixel substrate 2 which is an insulating substrate, than the first pad P1H and the second pad P2H in a plan view.

In addition, the d-wire section L2Hd of the branch wire of the second voltage supply line L2H extends in the region between the first lead-out wire group WLA and the second lead-out wire group WLB. A structure is adopted where a width (or a thickness or both of them) of the d-wire section L2Hd is (are) larger than a width (or a thickness or both of them) of each of the a-wire section L2Ha and the b-wire section L2Hb.

In addition, the drive electrode drive circuit CDR driving the transistors T2H functioning as switches of the switching circuit CSW is formed in the region between the first lead-out wire group WLA and the second lead-out wire group WLB.

Also, the branch wire of the second voltage supply line L2H includes the e-wire section L2He overlapping with the driver chip IC in a plan view. A structure is adopted where a width (or a thickness or both of them) of the e-wire section L2He is (are) larger than the width (or the thickness or both of them) of each of the a-wire section L2Ha and the b-wire section L2Hb. By adopting such a structure, the same effects as in the first voltage supply line L1 can also be obtained in the second voltage supply line L2H.

Further, the first voltage supply line L1, the second voltage supply line L2L, and the second voltage supply line L2H will be compared with one another with reference to FIGS. 7 and 8. The first voltage supply line L1 is a wire supplying the voltage VCOMDC during the display period in which the drive electrode COML which is the second electrode functions as a display electrode displaying an image. The second voltage supply line L2L and the second voltage supply line L2H are wires supplying the voltages TPL and TPH, respectively, during the touch detection period in which the drive electrode COML functions as a detection electrode detecting proximity or contact of an object. The second voltage supply line L2L supplies the voltage TPL, and the second voltage supply line L2H supplies the voltage TPH. Accordingly, the AC drive signal having the amplitude between the voltage TPH and the voltage TPL is generated.

The transistors functioning as switches of the switching circuit CSW include the first transistors T1, the second transistors T2L, and the second transistors T2H. A set of the first transistor T1, the second transistor T2L, and the second transistor T2H is provided for each drive electrode COML.

The first voltage supply line L1 includes the d-wire section L1d and the e-wire section L1e which constitute a first branch wire as a branch wire. The second voltage supply line L2L includes the d-wire section L2Ld and the e-wire section L2Le which constitute a second branch wire as a branch wire. The second voltage supply line L2H includes the d-wire section L2Hd and the e-wire section L2He which constitute a second branch wire as a branch wire.

The first voltage supply line L1 is electrically connected to the common wire CL via the first transistor T1. The second voltage supply line L2L is electrically connected to the common wire CL via the second transistor T2L. The second voltage supply line L2H is electrically connected to the common wire CL via the second transistor T2H. The common wire CL is connected to the drive electrode COML.

When the first voltage supply line L1, the second voltage supply line L2L, and the second voltage supply line L2H are compared with one another, the first voltage supply line L1 has a structure where the resistance value of the first voltage supply line L1 is lower than each of the second voltage supply line L2L and the second voltage supply line L2H. For example, the width, the thickness, the length, and furthermore, the material and the like of the wire affect the resistance value of the voltage supply line. Therefore, a structure with a low resistance value means that the width or the thickness of the wire is large, or the length of the wire is small, or the wire is made of a low-resistance material. Therefore, the first voltage supply line L1 can be made lower in resistance than each of the second voltage supply line L2L and the second voltage supply line L2H.

As described above, the plurality of lead-out wires WL include the first lead-out wire group WLA and the second lead-out wire group WLB. As described above, the first voltage supply line L1 includes the d-wire section L1d which is the first branch wire as a branch wire. The second voltage supply line L2L includes the d-wire section L2Ld which is the second branch wire as a branch wire. The second voltage supply line L2H includes the d-wire section L2Hd which is the second branch wire as a branch wire. The d-wire section L1d, the d-wire section L2Ld, and the d-wire section L2Hd, and the drive electrode drive circuit CDR are formed in the region between the first lead-out wire group WLA and the second lead-out wire group WLB. Also, the drive electrode drive circuit CDR is disposed between the d-wire section L1d and the d-wire sections L2Ld and L2Hd.

Also, in the first voltage supply line L1, the d-wire section L1d of the branch wire extends from the branch section L1A, passes on the left side of the drive electrode drive circuit CDR, and is joined to the e-wire section L1e. In contrast, in the second voltage supply lines L2L and L2H, the d-wire sections L2Ld and L2Hd of the branch wires extend from the branch sections L2LA and L2HA, pass on the right side of the drive electrode drive circuit CDR, and are joined to the e-wire sections L2Le and L2He, respectively. Therefore, since one wire section, that is, the d-wire section L1d of the first voltage supply line L1, is arranged on the left side of the drive electrode drive circuit CDR, and two wire sections, that is, the d-wire section L2Ld of the second voltage supply line L2L and the d-wire section L2Hd of the second voltage supply line L2H, are arranged on the right side of the drive electrode drive circuit CDR, a structure where the width (or the thickness or both of them) of the d-wire section L1d of the first voltage supply line L1 is larger can be adopted. Therefore, the resistance of the first voltage supply line L1 can be made lower.

In addition, the first voltage supply line L1 is more important than the second voltage supply lines L2L and L2H. Therefore, in the first voltage supply line L1, the branch wire extends from the branch section L1A and is joined to both the merging section L1B of the a-wire section L1a and the merging section L1B of the b-wire section L1b via the d-wire section L1d and the e-wire section L1e.

In the above-described structure, for example, in the structure where a scan signal line wiring layer is arranged in a first metal layer on the pixel substrate 2, a video signal line wiring layer is arranged in a second metal layer, and another wiring layer is arranged in a third metal layer, the first voltage supply line L1, the second voltage supply line L2L, and the second voltage supply line L2H are arranged in the second metal layer, which is the same layer as the video signal line wiring layer. In this case, a structure is adopted where the d-wire sections L1d, L2Ld, and L2Hd of the branch wires branched from the first voltage supply line L1, the second voltage supply line L2L, and the second voltage supply line L2H, respectively, overlap with the second metal layer, and the portions of the d-wire sections which pass over the second metal layer (an X portion illustrated in FIG. 7) are wired in either the first metal layer or the third metal layer to pass over the second metal layer.

In addition, the lead-out wire WL includes a straight-line section joined to the output of the driver chip IC and formed in the scan signal line wiring layer, and an oblique-line section joined to the RGB selection circuit SSW and formed in the video signal line wiring layer. The d-wire sections L1d, L2Ld, and L2Hd of the branch wires intersect with the oblique-line section. This is because the resistance is lowered by routing the branch wires at the shortest distance. In order to route the branch wires at the shortest distance, the branch wires intersect with the lead-out wire WL in the scan signal line wiring layer. As described, the branch wires include overlapping sections (d-wire sections L1d, L2Ld, and L2Hd) overlapping with the lead-out wire WL, and the overlapping section and the portion other than the overlapping section of the branch wire are wired in different layers.

The operation of the switching circuit CSW of the drive electrodes COML will be described with reference to FIG. 8. During the touch detection period, the drive electrode (second electrode) drive circuit CDR alternately turns ON the transistor T2L and the transistor T2H, and thus, the AC drive signal having the amplitude between the voltage TPL and the voltage TPH is supplied to the selected drive electrode COML. At that time, the transistor T1 corresponding to the selected drive electrode COML is turned OFF. In contrast, the drive electrode drive circuit CDR turns ON the transistor T1, and thus, the voltage of the non-selected drive electrode COML is fixed at the DC voltage of the voltage VCOMDC. At this time, the transistors T2L and T2H corresponding to the non-selected drive electrode COML are turned OFF.

According to the above-described first example of the power supply path of the drive electrode switching circuit illustrated in FIGS. 7 and 8, since power is supplied also from a center of the switching circuit CSW in addition to the right and left sides of the switching circuit CSW, the number of power supply paths to the drive electrodes COML increases. Therefore, the resistance of the power supply can be lowered. As a result, the time constants of the selected drive electrode COML and the non-selected drive electrodes COML are improved. For example, the time constant of the selected drive electrode COML is improved by about 25%, and the time constants of the non-selected drive electrodes COML are improved by about 50%, and there is an effect of enabling improvement of the touch detection property due to the time constants. Since this phenomenon becomes more apparent as the dimensions of the panel become larger or the resolution of the panel becomes higher, this phenomenon is advantageous for increasing the size and the resolution of the panel. Alternatively, in a case where it is not necessary to further improve the time constants, there is an effect that the frame can be made narrower while maintaining the time constants by narrowing the original wire widths of the voltage supply lines routed in the switching circuit CSW.

<Second Example of Power Supply Path of Drive Electrode Switching Circuit>

Figure 10:
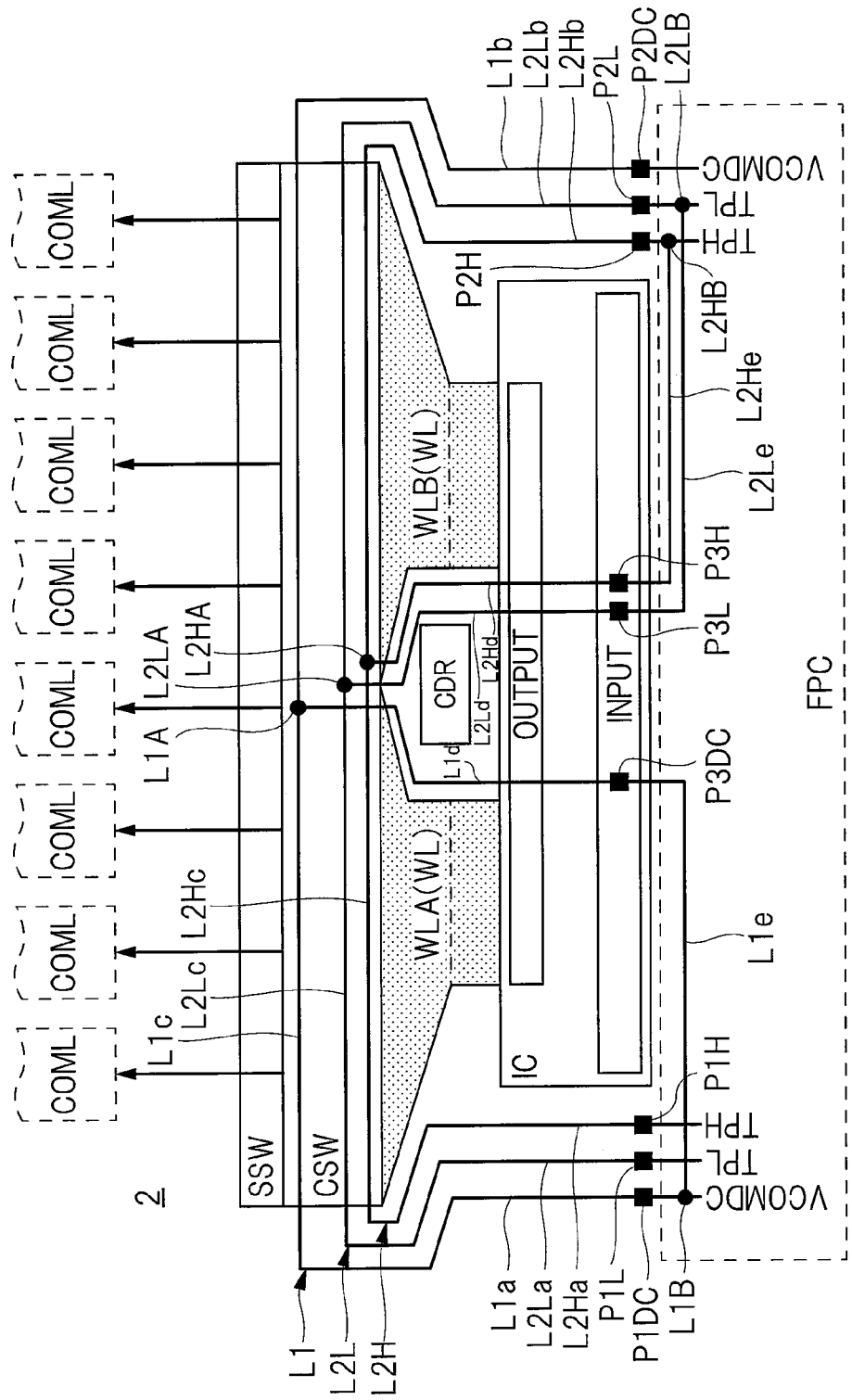
FIG. 10 is an explanatory diagram illustrating a second example of the power supply path of the drive electrode switching circuit in the display apparatus with a touch detection function according to the embodiment.

FIG. 10 is an explanatory diagram illustrating a second example of the power supply path of the drive electrode switching circuit in the display apparatus with a touch detection function according to the present embodiment. Here, points different from the above-described first example will be mainly described.

The second example of the power supply path of the drive electrode switching circuit illustrated in FIG. 10 is a power supply path where third pads P3DC, P3L, and P3H of the three types of power supplies to which bumps of the driver chip IC are connected are provided near a center part of the driver chip IC on the pixel substrate 2, and where branch wires extend from the flexible printed circuit board FPC are routed under the driver chip IC via the third pads P3DC, P3L, and P3H of the three types of power supplies of the driver chip IC to supply power to the central part of the switching circuit CSW. Each of e-wire sections L1e, L2Le, and L2He of the branch wires are connected to each of the third pads P3DC, P3L, and P3H.

In the example illustrated in FIG. 10, a first voltage supply line L1 (voltage VCOMDC) is a power supply path where the branch wire is led in from the left side on the flexible printed circuit board FPC, is routed under the driver chip IC via the third pad P3DC of the driver chip IC, passes on the left side of the drive electrode drive circuit CDR, is led out from the central portion of the drive electrode drive circuit CDR, and supplies power to the central part of the switching circuit CSW. The branch wire of the first voltage supply line L1 includes a d-wire section L1d extending in the longitudinal direction on the center side of the pixel substrate 2 from the branch section L1A of the c-wire section L1c via the third pad P3DC of the driver chip IC, and an e-wire section L1e connected to the d-wire section L1d, extending in the lateral direction, and electrically connected to a merging section L1B of the a-wire section L1a on the flexible printed circuit board FPC.

Also, a second voltage supply line L2L (voltage TPL) and a second voltage supply line L2H (voltage TPH) are substantially similar to the first voltage supply line L1.

In the first voltage supply line L1, the second voltage supply line L2L, and the second voltage supply line L2H, the third pads P3DC, P3L, and P3H of the three types of power supplies provided on the driver chip IC are floating or output power of respective power supplies.

Also in the second example of the power supply path of the drive electrode switching circuit illustrated in FIG. 10, the similar effects as in the above-described first example can be obtained. In particular, since the branch wires can be routed on the flexible printed circuit board FPC in this second example, there is an advantage that the widths of the wires can be easily increased.

<Third Example of Power Supply Path of Drive Electrode Switching Circuit>

Figure 11:
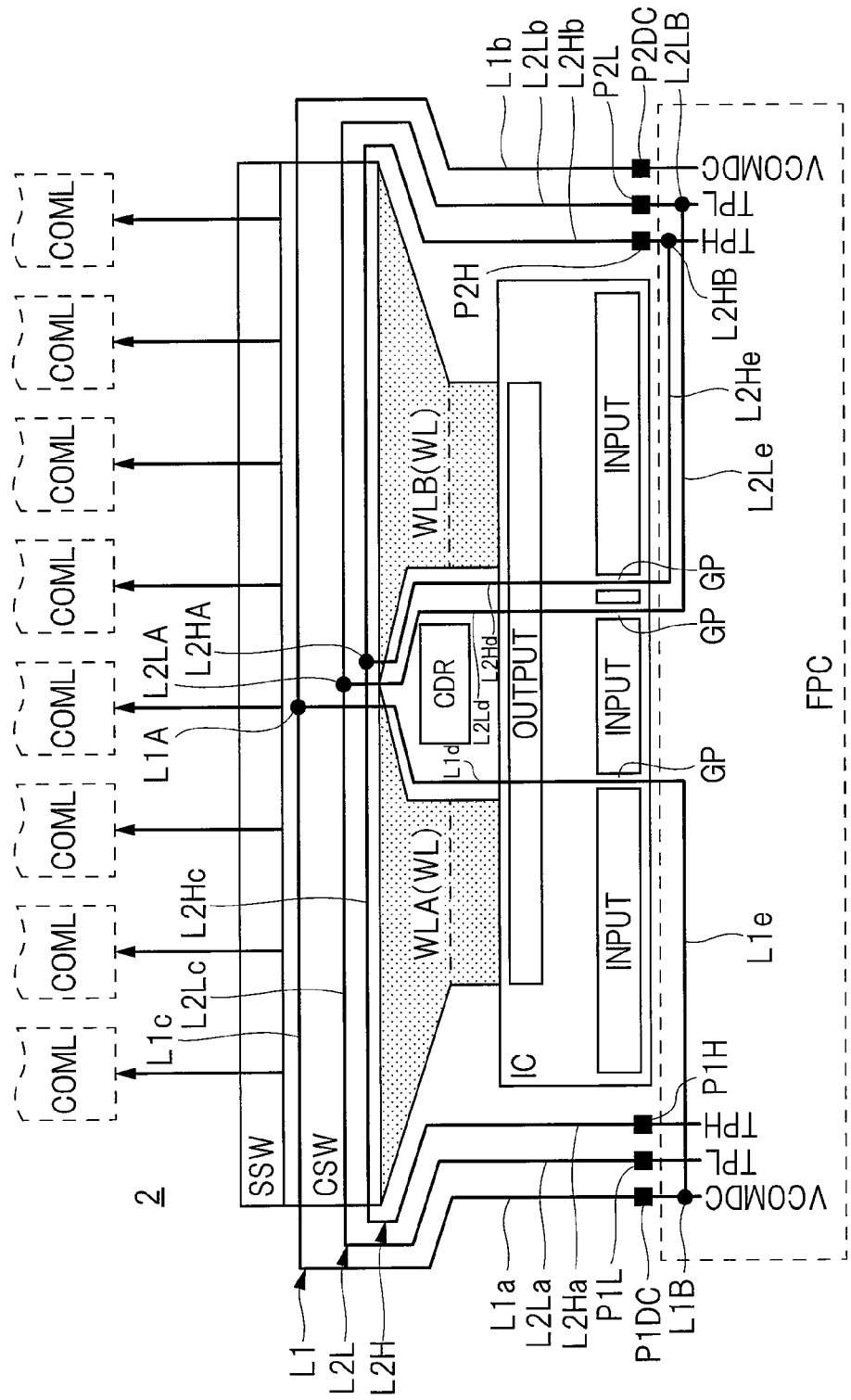
FIG. 11 is an explanatory diagram illustrating a third example of the power supply path of the drive electrode switching circuit in the display apparatus with a touch detection function according to the embodiment.

FIG. 11 is an explanatory diagram illustrating a third example of the power supply path of a drive electrode switching circuit in the display apparatus with a touch detection function according to the present embodiment. Here, points different from the above-described first and second examples will be mainly described.

The third example of the power supply path of the drive electrode switching circuit illustrated in FIG. 11 is a power supply path where gaps GP which are regions without pads are provided near the center of the driver chip IC on the pixel substrate 2, and where branch wires of the three types of power supplies extend from the flexible printed circuit board FPC, are routed under the driver chip IC via the gaps GP which are regions without pads in the driver chip IC to supply power to the central part of the switching circuit CSW.

In the example illustrated in FIG. 11, the first voltage supply line L1 (voltage VCOMDC) is a power supply path where the branch wire is led in from the left side on the flexible printed circuit board FPC, is routed under the driver chip IC via the gap GP which is a region without pads in the driver chip IC, passes on the left side of the drive electrode drive circuit CDR, is led out from the central portion of the drive electrode drive circuit CDR to supply power to the central part of the switching circuit CSW. The branch wire of the first voltage supply line L1 includes a d-wire section L1d extending in the longitudinal direction on the center side of the pixel substrate 2 from the branch section L1A of the c-wire section L1c via the gap GP which is a region without pads in the driver chip IC, and the e-wire section L1e connected to the d-wire section L1d, extending in the lateral direction and electrically connected to the merging section L1B of the a-wire section L1a on the flexible printed circuit board FPC.

Also, a second voltage supply line L2L (voltage TPL) and a second voltage supply line L2H (voltage TPH) are substantially similar to the first voltage supply line L1.

Also in the third example of the power supply path of the drive electrode switching circuit illustrated in FIG. 11, the similar effects as in the above-descried first example can be obtained. In particular, since the branch wires can be routed on the flexible printed circuit board FPC in the same manner as in the above-descried second example, there is an advantage that the widths of the wires can be easily increased.

<Fourth Example of Power Supply Path of Drive Electrode Switching Circuit>

FIG. 12 is an explanatory diagram illustrating a fourth example of the power supply path of the drive electrode switching circuit in the display apparatus with a touch detection function according to the present embodiment. Here, points different from the above-described first to third examples will be mainly described.

The fourth example of the power supply path of the drive electrode switching circuit illustrated in FIG. 12 is a power supply path where branch wires of the three types of power supplies are routed on portions of the lead-out wires WL for driver chip IC output formed in the scan signal line wiring layer to supply power to the central part of the switching circuit CSW. The lead-out wire WL is formed in the peripheral region and is connected to the video signal line SL formed in the pixel region.

In the example illustrated in FIG. 12, a first voltage supply line L1 (voltage VCOMDC) is a power supply path where the branch wire is led in from the first voltage supply line L1 arranged on the right side and the left side, is routed on the portions of the lead-out wires WL formed in the scan signal line wiring layer, passes on the left side of the drive electrode drive circuit CDR, is led out from the central portion of the drive electrode drive circuit CDR to supply power to the central part of the switching circuit CSW. The branch wire of the first voltage supply line L1 includes a d-wire section L1d extending in the longitudinal direction on the center side of the pixel substrate 2 from the branch section L1A of the c-wire section L1c, and an e-wire section L1e connected to the d-wire section L1d, extending in the lateral direction, routed on or under the portions of the lead-out wires WL formed in the scan signal line wiring layer, and electrically connected to the merging section L1B of the a-wire section L1a and the merging section L1B of the b-wire section L1b.

Also, a second voltage supply line L2L (voltage TPL) and a second voltage supply line L2H (voltage TPH) are substantially similar to the first voltage supply line L1.

In contrast to the above-described first to third examples, in the fourth example illustrated in FIG. 12, the branch wires of the first voltage supply line L1 and the second voltage supply line L2L pass on the left side of the drive electrode drive circuit CDR, and the branch wire of the second voltage supply line L2H passes on the right side of the drive electrode drive circuit CDR. However, the similar path as in the above-described first to third examples can be adopted.

Also in the fourth example of the power supply path of the drive electrode switching circuit illustrated in FIG. 12, the similar effects as in the above-descried first example can be obtained. In particular, since the branch wire can be routed on the portion of the lead-out wire WL formed in the scan signal line wiring layer at the shortest distance, there is an advantage that resistance can be further lowered.

<Fifth Example of Power Supply Path of Drive Electrode Switching Circuit>

FIG. 13 is an explanatory diagram illustrating a fifth example of the power supply path of the drive electrode switching circuit in the display apparatus with a touch detection function according to the present embodiment. Here, points different from the above-described first to fourth examples will be mainly described.

In the fifth example of the power supply path of the drive electrode switching circuit illustrated in FIG. 13, a power supply location to be added is not limited to the center, and for example, power is supplied from the locations at approximately one fourth the width of the switching circuit CSW from the right and left, so that the time constants can be further lowered. In the example illustrated in FIG. 13, in addition to the power supply path inputting power to the central part of the switching circuit CSW as illustrated in the above-described first example, a power supply path inputting power to the location at approximately one fourth the width of the switching circuit CSW from the left, and a power supply path inputting power to the location at approximately one fourth the width of the switching circuit CSW from the right are added.

In the power supply path inputting power to the location at approximately one fourth the width of the switching circuit CSW from the left, a branch wire of a first voltage supply line L1 is branched from a branch section L1A of a c-wire section L1c and joined to the e-wire section L1e. A branch wire of a second voltage supply line L2L is branched from a branch section L2LA of a c-wire section L2Lc and joined to an e-wire section L2Le. A branch wire of a second voltage supply line L2H is branched from a branch section L2HA of a c-wire section L2Hc and joined to an a-wire section L2Ha.

In the power supply path inputting power to the location at approximately one fourth the width of the switching circuit CSW from the right, a branch wire of the first voltage supply line L1 is branched from the branch section L1A of the c-wire section L1c and joined to the e-wire section L1e. A branch wire of the second voltage supply line L2L is branched from the branch section L2LA of the c-wire section L2Lc and joined to the b-wire section L2Lb. A branch wire of the second voltage supply line L2H is branched from the branch section L2HA of the c-wire section L2Hc and joined to the b-wire section L2Hb.

Since the branch wires of the first and second voltage supply lines L1, L2L, and L2H overlap with the second metal layer in which the video signal line wiring layer is arranged, the portions of the branch wires intersecting with the second metal layer need to be wired in either the first metal layer or the third metal layer.

Also in the fifth example of the power supply path of the drive electrode switching circuit illustrated in FIG. 13, the similar effects as in the above-descried first example can be obtained. In particular, since the power supply paths are additionally provided, there is an advantage that the time constants can be further lowered.

<Sixth Example of Power Supply Path of Drive Electrode Switching Circuit>

In the display apparatus with a touch detection function according to the present embodiment, a sixth example of the power supply path of the drive electrode switching circuit is a modification example of the above-described first to fifth examples. For example, in the above-described first to fifth examples, a description has been given of an example where all the three types of power supplies supply power to the central part of the switching circuit CSW; however, only one type of power supply or two types of power supplies may supply power to the central part of the switching circuit CSW. Also, the above-described first to fifth examples may be applied in combination. In addition, in the above-described first to fifth examples, a description has been given of an example where the branch wire of the first voltage supply line L1 (voltage VCOMDC) supplies power from both the right side and the left side, and the branch wire of each of the second voltage supply line L2L (voltage TPL) and the second voltage supply line L2H (voltage TPH) supplies power from one side. However, the sixth example is not limited to this, and the branch wires of all the voltage supply lines may supply power from the both the right and left sides or from only one side, or the power supply path may use a branch wire supplying power from both the right and left sides and a branch wire supplying power from only one side in combination.

In the foregoing, the invention made by the inventors of the present invention has been concretely described based on the embodiments. However, it is needless to say that the present invention is not limited to the foregoing embodiments and various modifications and alterations can be made within the scope of the present invention.

In the foregoing embodiments, a liquid crystal display apparatus is exemplified as a disclosure example; however other application examples include any flat-panel display apparatus such as an organic EL display apparatus, a self-luminous display apparatus other than the organic EL display apparatus, an electronic paper display apparatus including an electrophoretic element and the like.

Various modifications and alterations can be conceived by those skilled in the art within the spirit of the present invention, and it is understood that such modifications and alterations are also encompassed within the scope of the present invention. For example, those skilled in the art can suitably modify the above-described embodiment by addition, deletion, or design change of components, or by addition, omission, or condition change of steps. Such modifications are also encompassed within the scope of the present invention as long as they include the gist of the present invention.

Those apparent from the description of the specification or imagined easily by those skilled in the art about other advantageous effects generated by the configuration described in the embodiment are considered by being generated by the present invention as a matter of course.

What is claimed is:

1. A display apparatus comprising:
   an insulating substrate;
   an optical element layer;
   a first electrode provided between the insulating substrate and the optical element layer;
   a second electrode;
   a plurality of video signal lines formed in a pixel region;
   a plurality of lead-out wires formed in a peripheral region;
   a drive circuit;
   a first pad electrically connected to the drive circuit;
   a second pad electrically connected to the drive circuit;
   a voltage supply line electrically connected to the first pad and the second pad;
   a common wire electrically connected to the voltage supply line and the second electrode;
   a plurality of transistors formed between the voltage supply line and the common wire, and being arrayed in a first direction; and
   a driver chip to which the plurality of lead-out wires are electrically connected, and disposed between the first pad and the second pad in a plan view,
   wherein the first electrode is provided between the second electrode and the optical element layer,
   the voltage supply line includes an a-wire section, a b-wire section, a c-wire section, a d-wire section, and an e-wire section,
   the a-wire section extends from the first pad in a second direction intersecting with the first direction,
   the b-wire section extends from the second pad in the second direction,
   the c-wire section extends in the first direction and includes a portion coupling between the a-wire section and the b-wire section, the d-wire section extends from a branch section of the c-wire section in the second direction, the e-wire section extends from another end of the d-wire section in the first direction and is disposed between the c-wire section and the driver chip in a plan view, the branch section is located in the portion of the c-wire section in a plan view.

2. The display apparatus according to claim 1, wherein one of the plurality of lead-out wires is electrically connected to one of the plurality of video signal lines, the plurality of lead-out wires include a first lead-out wire group and a second lead-out wire group, and the d-wire section extends in a region between the first lead-out wire group and the second lead-out wire group.

3. The display apparatus according to claim 2, wherein the first lead-out wire group is disposed between the a-wire section and the d-wire section, and a width of the d-wire section is larger than a width of the a-wire section.

4. The display apparatus according to claim 2, further comprising:

a second electrode drive circuit driving the plurality of transistors, wherein the second electrode drive circuit is formed in a region between the first lead-out wire group and the second lead-out wire group.

5. The display apparatus according to claim 2, further comprising an another voltage supply line, wherein the voltage supply line has the a-wire section, the b-wire section, the c-wire section, the d-wire section, and the e-wire section, the another voltage supply line has another a-wire section, another b-wire section, another c-wire section, another d-wire section, and another e-wire section, the plurality of transistors includes a first transistor and a second transistor, the voltage supply line is electrically connected to the common wire via the first transistor, and the another voltage supply line is electrically connected to the common wire via the second transistor.

6. The display apparatus according to claim 1, further comprising:

a second electrode drive circuit driving the plurality of transistors;

wherein one of the plurality of lead-out wires is electrically connected to one of the plurality of video signal lines, the plurality of lead-out wires include a first lead-out wire group and a second lead-out wire group, and the second electrode drive circuit is formed in a region between the first lead-out wire group and the second lead-out wire group.

7. The display apparatus according to claim 6, further comprising an another voltage supply line, wherein the voltage supply line has the a-wire section, the b-wire section, the c-wire section, the d-wire section, and the e-wire section, the another voltage supply line has another a-wire section, another b-wire section, another c-wire section, another d-wire section, and another e-wire section, the plurality of transistors includes a first transistor and a second transistor, the voltage supply line is electrically connected to the common wire via the first transistor, and the another voltage supply line is electrically connected to the common wire via the second transistor.

8. The display apparatus according to claim 1, further comprising an another voltage supply line, wherein the voltage supply line has the a-wire section, the b-wire section, the c-wire section, the d-wire section, and the e-wire section, the another voltage supply line has another a-wire section, another b-wire section, another c-wire section, another d-wire section, and another e-wire section, the plurality of transistors includes a first transistor and a second transistor, the voltage supply line is electrically connected to the common wire via the first transistor, and the another voltage supply line is electrically connected to the common wire via the second transistor.

9. The display apparatus according to claim 8, wherein the second electrode is supplied a voltage from one of the voltage supply line and the another voltage supply line, the second electrode functions as a display electrode when the voltage is supplied from the voltage supply line to the second electrode, the second electrode functions as a detection electrode when the voltage is supplied from the another voltage supply line to the second electrode, and a resistance value of the voltage supply line is lower than a resistance value of the another voltage supply line.

10. The display apparatus according to claim 1, wherein the e-wire section is overlapping with the driver chip in a plan view.

11. The display apparatus according to claim 10, wherein a width of the e-wire section is larger than a width of the a-wire section.

12. The display apparatus according to claim 10, wherein the e-wire section is not connected to the driver chip.

13. The display apparatus according to claim 1, wherein a width of the c-wire section is larger than a width of the a-wire section.

14. The display apparatus according to claim 1, wherein the c-wire section is connected to the a-wire section and the b-wire section.

15. The display apparatus according to claim 1, wherein the c-wire section is connected to one of the a-wire section and the b-wire section.

* * * * *